US012602654B2

(12) United States Patent
Hepworth et al.

(10) Patent No.: US 12,602,654 B2
(45) Date of Patent: Apr. 14, 2026

(54) SEQUENTIAL RECONFIGURATION GUIDANCE WITH SYNCHRONIZATION ACROSS DEVICES

(71) Applicant: Walmart Apollo, LLC, Bentonville, AR (US)

(72) Inventors: Ammon Ikaika No Kapono Hepworth, Bella Vista, AR (US); Frank Thomas Sampognaro, Jr., Bentonville, AR (US); Ethan Baker McGee, Bentonville, AR (US); Yusuf Serki, Bentonville, AR (US); Vinay Vishnumurthy Adiga, Burlington (CA); David Balaun, Noel, MO (US); Beverly Ben-Lulu, Centerton, AR (US); Zachary Springer, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 142 days.

(21) Appl. No.: 18/583,564

(22) Filed: Feb. 21, 2024

(65) Prior Publication Data
US 2025/0265541 A1 Aug. 21, 2025

(51) Int. Cl.
G06Q 10/087 (2023.01)
G06F 3/147 (2006.01)
G06T 11/00 (2006.01)
(52) U.S. Cl.
CPC ........... *G06Q 10/087* (2013.01); *G06F 3/147* (2013.01); *G06T 11/001* (2013.01); *G06T 2200/24* (2013.01)

(58) Field of Classification Search
CPC ..... G06Q 10/087; G06F 3/147; G06T 11/001; G06T 2200/24
See application file for complete search history.

(56) References Cited

U.S. PATENT DOCUMENTS

| 10,021,995 B2 * | 7/2018 | Volz ........................ A47F 5/118 |
| 10,339,579 B2 * | 7/2019 | Bonner .............. G06Q 30/0635 |
| 11,263,581 B2 * | 3/2022 | Reid ...................... G06V 40/28 |

(Continued)

OTHER PUBLICATIONS

Unknown, "Button Label—Pick-by-light made easy", e-shelf-labels, Jan. 3, 2024 (date of pdf download), 6 pages.

*Primary Examiner* — Michael Jared Walker
(74) *Attorney, Agent, or Firm* — Foley IP Law, PLLC

(57) ABSTRACT
Examples provide an automatic item display reconfiguration guidance system providing sequential reconfiguration instructions presented to a user coordinated across multiple display devices in real-time as the modular item display is being reconfigured from an original item configuration to a new item configuration. A sequence of graphical instructions for removing a set of items, moving a set of items, and adding a set of new items to the modular item display are generated and presented to a user via a user interface (UI) on a user device and/or one or more shelf display device(s) on the modular item display in a substantially simultaneous manner. The graphical instructions including, color-coded indicators and/or images of the items, are presented to the user in real-time as items are removed, moved, or added in sequence enabling fast and efficient reconfiguration of items on the display with minimized expenditure of labor and reduced error rate.

20 Claims, 19 Drawing Sheets

(56) References Cited

U.S. PATENT DOCUMENTS

| | | | |
|---|---|---|---|
| 11,574,267 B2 * | 2/2023 | Fanourgiakis ... | G06Q 10/06313 |
| 2004/0104653 A1 * | 6/2004 | Schildknecht ....... | B65G 1/1373 |
| | | | 312/352 |
| 2008/0164310 A1 * | 7/2008 | Dupuy .................... | G06F 3/147 |
| | | | 235/385 |
| 2013/0226742 A1 * | 8/2013 | Johnson ................. | G06Q 30/02 |
| | | | 705/27.1 |
| 2015/0088703 A1 * | 3/2015 | Yan ...................... | G06Q 10/087 |
| | | | 705/28 |
| 2017/0193430 A1 * | 7/2017 | Barreira Avegliano ..................... | |
| | | | G06V 20/52 |
| 2018/0260767 A1 * | 9/2018 | Findlay ............... | G06Q 10/087 |
| 2018/0300043 A1 * | 10/2018 | Graham ................. | G06V 10/42 |
| 2019/0266652 A1 * | 8/2019 | Bonner ............. | G06Q 30/0625 |
| 2019/0279017 A1 * | 9/2019 | Graham .............. | G07G 1/0063 |

* cited by examiner

Figure 2:
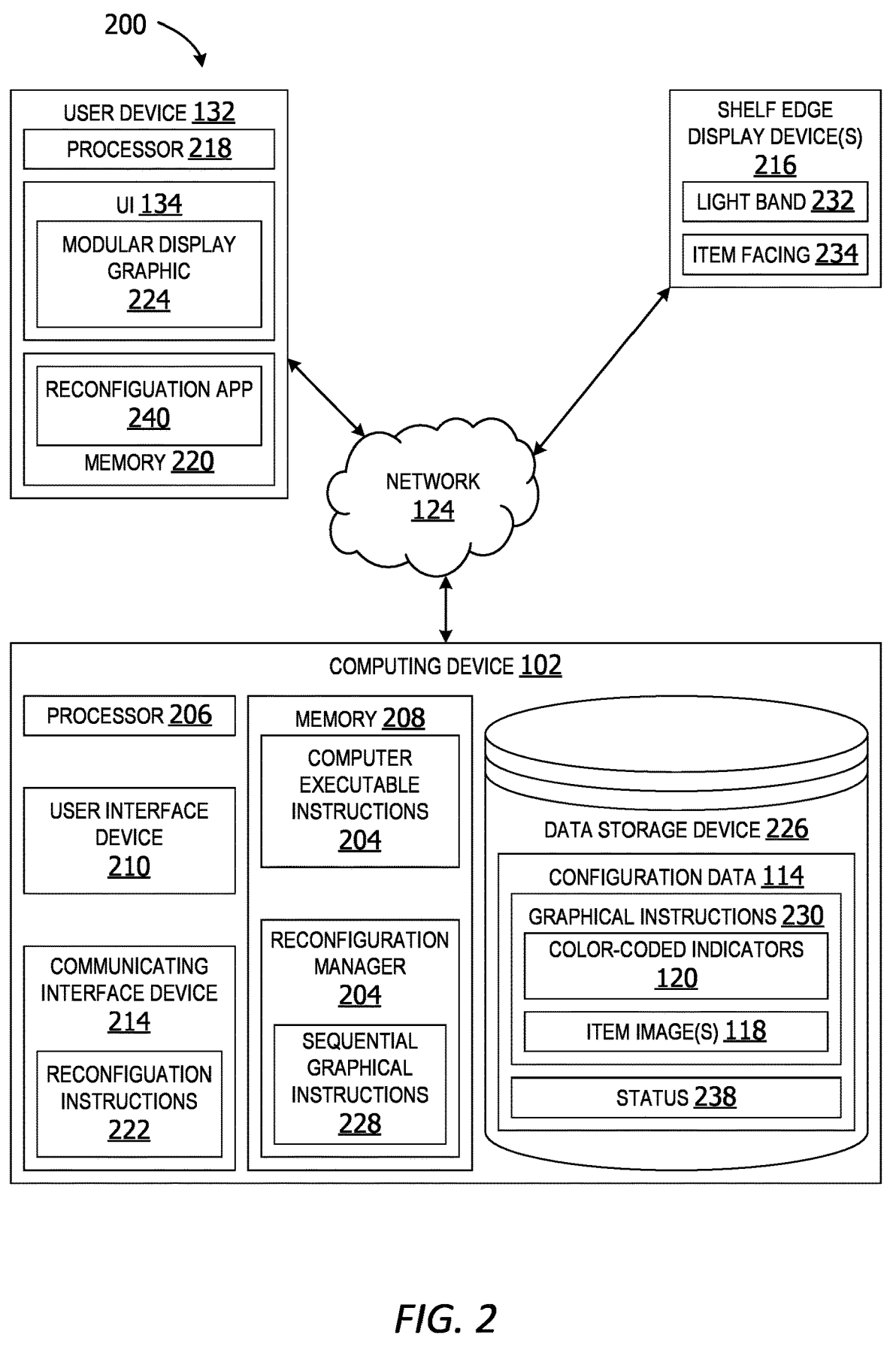

200

USER DEVICE 132

PROCESSOR 218

UI 134

MODULAR DISPLAY
GRAPHIC
224

RECONFIGUATION APP
240

MEMORY 220

**SHELF EDGE
DISPLAY DEVICE(S)
216**

LIGHT BAND 232

ITEM FACING 234

NETWORK
124

COMPUTING DEVICE 102

PROCESSOR 206

USER INTERFACE
DEVICE
210

COMMUNICATING
INTERFACE DEVICE
214

RECONFIGUATION
INSTRUCTIONS
222

MEMORY 208

COMPUTER
EXECUTABLE
INSTRUCTIONS
204

RECONFIGURATION
MANAGER
204

SEQUENTIAL
GRAPHICAL
INSTRUCTIONS
228

DATA STORAGE DEVICE 226

CONFIGURATION DATA 114

GRAPHICAL INSTRUCTIONS 230

COLOR-CODED INDICATORS
120

ITEM IMAGE(S) 118

STATUS 238

START

OBTAIN RECONFIGURATION INSTRUCTIONS FOR MODULAR DISPLAY
1602

GENERATE FIRST SET OF GRAPHICAL INSTRUCTIONS
1604

SEND TO UI AND/OR SHELF DISPLAY(S)
1606

CONFIRM?
1608
NO

YES

GENERATE SECOND SET OF GRAPHICAL INSTRUCTIONS
1610

SEND TO UI AND/OR SHELF DISPLAY(S)
1612

CONFIRM?
1614
NO

YES

GENERATE THIRD SET OF GRAPHICAL INSTRUCTIONS
1616

SEND TO UI AND/OR SHELF DISPLAY(S)
1618

END

1800

SEQUENTIAL RECONFIGURATION GUIDANCE WITH SYNCHRONIZATION ACROSS DEVICES

BACKGROUND

A modular display is an area within a store or other retail facility for displaying items available for sale or lease to customers. A modular display includes shelves or other item display devices supporting or storing items in accordance with an assigned configuration of items. The configuration specifies which items should be displayed on the modular display and assigns a location to instances of each item. When the configuration is changed, a user manually removes all the items and shelf label tags from the modular display. New tags are placed on the shelves in the locations assigned to the new items to be placed on the shelves. The items matching the new tags are then manually placed on the shelves in the assigned locations. This is a time-consuming, labor-intensive, and inefficient process.

SUMMARY

Some embodiments provide a system and method for providing sequential modular display reconfiguration guidance. A reconfiguration manager generates reconfiguration instructions for reconfiguring a modular display from a current item configuration to a new item configuration. The reconfiguration instructions include graphical instructions for sequentially reconfiguring the modular display to the new item configuration. The reconfiguration manager generates a first set of graphical instructions using the reconfiguration instructions for presentation to a user via a user interface (UI) of a user device and/or one or more shelf display devices. The first set of graphical instructions identify a first set of items in the plurality of items to be removed from the modular display. The reconfiguration manager receives confirmation indicating removal of the first set of items from the modular display is complete. The reconfiguration manager generates a second set of graphical instructions using the reconfiguration instructions for presentation to the user via the UI upon receipt of the first confirmation. The second set of graphical instructions identify a second set of items in the plurality of items to be relocated from an original location in accordance with the first configuration to a new location in accordance with the second configuration. The reconfiguration manager receives confirmation indicating relocation of the second set of items on the modular display is complete. The reconfiguration manager generates a third set of graphical instructions using the reconfiguration instructions for presentation to the user via the UI and/or the shelf display device(s). The third set of graphical instructions identify a third set of items to be added to the modular display for efficient reconfiguration of the modular display from the first configuration to the second configuration. Once complete, a status of the modular display is updated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 is an exemplary block diagram illustrating a system for generating sequential graphical reconfiguration instructions to reconfigure a modular display.

Corresponding reference characters indicate corresponding parts throughout the drawings.

DETAILED DESCRIPTION

Figure 1:
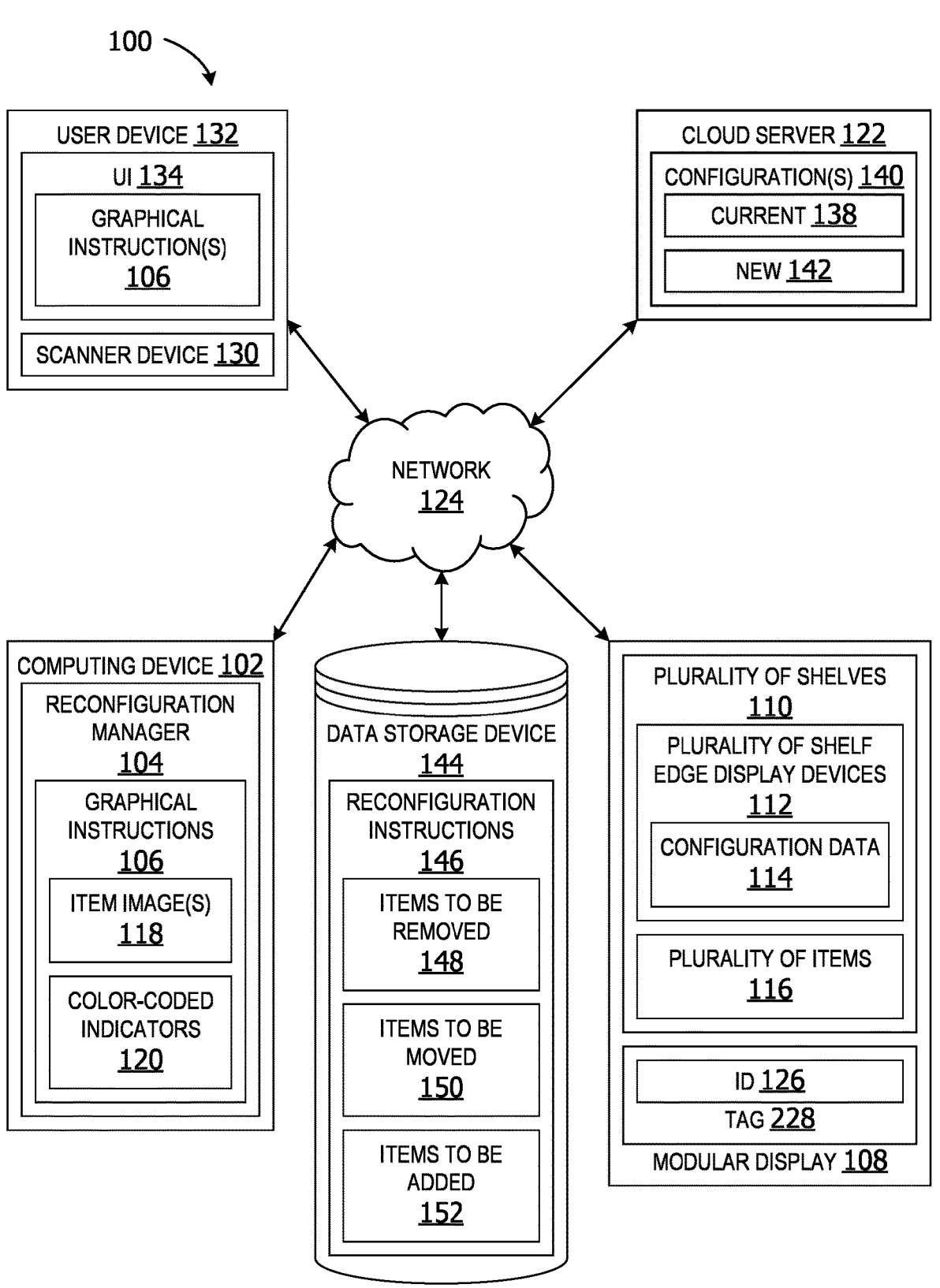
FIG. 1 is an exemplary block diagram illustrating a system for generating sequential graphical reconfiguration instructions coordinated across display devices.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

When a modular display is updated in accordance with a new configuration of items for the display, a user manually removes all the items and item price tags from the shelves. The user then manually places new paper price tags matching the new items which are then placed on the shelves in accordance with the new configuration, as detailed in a planogram or other assigned item assortment. This is a slow, tedious, and potentially error prone process.

In some solutions, a pick-by-light system may be employed to assist the user in obtaining items from totes, bins or other storage areas in a backroom or storage area for placement on the modular display. The pick-by-light system provides lights on bins that light up to indicate which bin contains items the user is supposed to obtain for stocking shelves or filling online grocery orders. However, the pick-by-light system is limited to a light that indicates a storage bin containing items to be picked. It does not assist the user in identifying items to be removed from a display shelf on a sales floor, identifying items to be moved to a different location on the same display, identifying assigned locations for items to be placed on a display, generating the most optimal sequence of items to be removed, moved, and added, or determining the correct item facing dimensions on the display. Therefore, the pick-by-light system is insufficient for assisting a user in real-time with reconfiguring items on display on a sales floor.

Moreover, the pick-by-light system is limited to a single, light of fixed size and color which is incapable of providing sequential guidance, indicating whether items should be removed, moved, or added to a display and/or synchronization across devices in real-time as the user is reconfiguring the items on the display. Therefore, a more efficient, flexible, and accurate system is desirable to assist users with sequential item display reconfiguration instructions with easy-to-follow graphic indicators that is also capable of synchronization across other devices, such as a mobile user device providing dynamic reconfiguration guidance instructions.

Referring to the figures, embodiments of the disclosure enable provision of real-time reconfiguration graphical instructions in sequence with synchronization across display devices as the user reconfigures the items on a modular display. In some embodiments, a reconfiguration manager identifies items to be removed, moved, and added during reconfiguration of a modular display layout. The reconfiguration manager utilizes a display identifier (ID) to obtain reconfiguration instructions for sequentially reconfiguring the modular display from a first configuration of items to a second configuration of items on the modular display. The reconfiguration instructions includes a sequence of instructions for removing items which were included in the previous configuration, but which are absent from the new configuration, moving items which have been assigned to a new location on the modular display, and adding new items which were absent from the previous configuration, but which are included in the new configuration. The sequential graphical instructions are presented to a user across one or more display devices enabling the user to modify the item configuration in an efficient manner while preventing errors.

In some embodiments, the reconfiguration manager generates a set of graphical instructions identifying items to be removed from the modular display and/or a sequence in which to remove items from the modular display. The instructions include graphic images of the items to be removed and color-coded indicators overlaid on the graphic images of the items. The graphic images of the items are presented on a user interface of a mobile user device of the user reconfiguring the modular display and/or on one or more shelf edge display devices of the shelves on the modular display. The graphic images on the user device and the shelf displays are synchronized such that the images of the same products are displayed on the user device only, the shelf edge display only or both the user device and shelf edge display device substantially simultaneously. This enables the user to perform the step of removing unwanted items from the display quickly and efficiently while minimizing errors or mistakes.

Other embodiments enable presentation of a set of graphical instructions identifying items on the modular display which are present on both the previous configuration and the new configuration, but which are to be relocated to a new assigned location on the same modular display. The item relocation instructions include graphic images of the items displayed on the user device only, the shelf edge display device only, or both the user device and the shelf edge display device substantially simultaneously. The item relocation instructions are presented after the user verifies the first set of instructions for removing unwanted items has been completed. This frees up space on the modular display for relocating items. Moreover, the item relocation instructions are presented such that space is always available before any new items are to be placed in that location. This minimizes or eliminates user labor spent removing items from the display unnecessarily while improving speed and efficiency with which the modular display reconfiguration process is completed.

Some aspects of the embodiments provide graphical instructions for adding new items to the modular display in an optimized sequence after user confirmation of removal of items and relocation of items has been received. The graphical instruction for adding new items is presented via the user device only, the shelf edge display device only, or both the user device and the shelf edge display device substantially simultaneously. This enables improved user efficiency and reduced labor expended in reconfiguring a modular display.

Other embodiments provide color-coded indicators identifying items to be removed, moved, or added to the modular display in real-time as the user performs each step of removing items, relocating items, and/or adding new times to the modular display during the reconfiguration. As each step is performed, the shelf edge display lights up a band or length-wise area of the shelf edge display device corresponding to an item facing (assigned area) of the item being removed, moved, or added to the modular display. A different color is used for adding items and removing items. This enables clear and concise identification of items to be removed or moved. It further enables a user to quickly identify a location of items to be removed or moved. Furthermore, the color-coded indicators provide identification of item facings for placement of instances of new items onto the modular display, ensuring correct and accurate placement of items in their assigned locations on each modular display.

Still other embodiments provide color-coded indicators on a graphic representation of the modular display presented to the user via the user interface device of the user device associated with the user. The color-coded indicators highlight or otherwise indicate items to be removed, moved, or added to the display. The color-coded indicators on the user device graphic representation of the modular display are synchronized with the color-coded indicators displayed on the shelf edge display devices on the shelves of the modular display. This enables reduced confusion and prevents errors while further improving user efficiency and interaction performance via the user interface.

The computing device operates in an unconventional manner by providing graphical instructions with color-coded indicators in a sequential manner in real-time as a user is reconfiguring a display, such that the graphical instructions are coordinated and synchronized across multiple devices, such as a user device user interface and shelf display devices, such as a shelf edge display device or other digital tag on one or more shelves of the modular display. In this manner, the computing device is used in an unconventional way and allows coordinated guidance and sequential instructions to a user with improved accuracy and efficiency via the user interface, thereby improving the underlying function of the computing device.

The system further eliminates the need for paper shelf tags, paper prices tags, other labels, and/or paper instructions, which further reduces paper waste as well as conserving printer resources. Moreover, the system further reduces human error and human resources expended in reconfiguring displays by eliminating the need to manually remove all items from the display and then manually replace items back on the display one by one in accordance with the new configuration.

Referring again to FIG. 1, an exemplary block diagram illustrates a system 100 for generating sequential graphical reconfiguration instructions coordinated across display devices. The computing device 102 represents any device executing computer-executable instructions to implement the operations and functionality associated with the computing device 102. The computing device 102, in some embodiments includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In this example, the computing device 102 executes applications and software components, such as, but not limited to, a reconfiguration manager 104. The reconfiguration manager 104 generates sequential graphical instructions 106 for reconfiguring an assortment of items on a modular display 108. A modular display 108 is any type of display for displaying one or more items for viewing by customers within a retail facility, such as a brick-and-mortar store. The modular display 108 includes an item display structure, such as a plurality of shelves 110. The modular display 108 can include a temperature-controlled display case, partially enclosed shelves, clothing racks, a peg board with hooks, an aisle display, an end-cap display, or any other type of modular display. A temperature-controlled display case includes a refrigerated display case, a freezer display case, a heated display for cooked food items, or any other type of temperature-controlled display case. The modular display 108 can include shelves that are completely enclosed, such as shelving inside a display case with a door. The modular display 108 can also include unenclosed or partially enclosed shelving, such as shelving in a three-sided display case without a door.

The plurality of shelves 110 includes stand-alone shelves, gondola shelves, wall-mounted shelves, or any other type of shelving for displaying a plurality of items 116. The plurality of items 116 includes any type of items, such as food items, electronics, apparel (clothing) items, pet supplies, cleaning supplies, office supplies, seasonal items, craft supplies, cosmetics, as well as any other type of items.

In this example, the plurality of shelves 110 includes a plurality of shelf edge display devices 112. A shelf edge display device in the plurality of shelf edge display devices 112 includes any type of display device for displaying configuration data 114 to the user. The configuration data 114 is any type of data associated with changing a configuration of items on the modular display 108 from a current configuration to a new (updated) configuration. The configuration data 114 includes sequential graphical instructions 106.

A shelf configuration refers to a layout of items and item facings on a shelf or other portion of a modular display. The configuration optionally includes the number of instances of each item, a facing for each item, a number of instances of the item in the facing (number of facings per item), width of the space allocated to the item, etc. The current configuration is the layout of items now on the shelf. A new configuration is a different configuration for the items on a given shelf including changes or differences from the current configuration. A new configuration can include additional items not currently on the shelf which are to be added to the shelf, an absence of items which are currently on the shelf, but which are to be removed from the shelf, a different number of facings for one or more items on the shelf, a different width, and/or new locations (x-position) for items which are currently on the shelf but assigned to a new location on the shelf.

The sequential graphical instructions 106 include instructions for guiding a user in changing a configuration of items on the modular display 108. The sequential graphical instructions 106 in this example includes item image(s) 118 and/or color-coded indicators 120. The item image(s) 118 includes one or more images of one or more items in the plurality of items 116 which are scheduled to be removed from the modular display, moved to a new location on the modular display 108 or added to the modular display in accordance with the new configuration of the modular display.

In some embodiments, the reconfiguration manager 104 obtains the sequential graphical instructions 106 from a cloud server 122 via a network 124. In these examples, the reconfiguration manager 104 receives a modular display identifier (ID) 126. The modular display ID 126 is obtained when a user scans an ID tag 228 on the modular display 108 using a scanner device 130. The ID tag 228 is an identifier, such as, but not limited to, a universal product code (UPC), matrix barcode, or any other The user device 132 transmits the ID 126 to the computing device via the network 124.

The network 124 is implemented by one or more physical network components, such as, but without limitation, routers, switches, network interface cards (NICs), and other network devices. The network 124 is any type of network for enabling communications with remote computing devices, such as, but not limited to, a local area network (LAN), a subnet, a wide area network (WAN), a wireless (Wi-Fi) network, or any other type of network. In this example, the network 124 is a WAN, such as the Internet. However, in other embodiments, the network 124 is a local or private LAN.

The user device 132 represents any device executing computer-executable instructions. The user device 132 can be implemented as a mobile computing device, such as, but not limited to, a wearable computing device, a mobile telephone, laptop, tablet, computing pad, netbook, gaming device, and/or any other portable device. The user device 132 includes at least one processor and a memory. The user device 132 can also include a user interface device (UI) 134 for displaying the graphical instructions 106 to the user.

The graphical instructions 106 include a sequence of step-by-step instructions for reconfiguring the modular display configuration from a current 138 configuration to a new 142 configuration. The graphical instructions include item image(s) 118 and/or color-coded indicators 120. The color-coded indicators 120 include any type of indicators for identifying or highlighting one or more item image(s) 118 on the UI 132 and/or on a shelf display in the plurality of shelf edge display devices 112.

A color-coded indicator is any type of color-coded indicator associated with an image of an item or a location on a shelf, such as, but not limited to, highlighting overlaid on an image of an item, an arrow pointing to an image of an item, a box around an image of an item, a circle around an image of an item, underlining beneath an image of an item, brackets partially enclosing an image of an item, etc. An indicator in other examples includes an indicator identifying a location on a shelf corresponding to an item facing for the area assigned to instances of the item. The indicator in these examples include indicators, such as, highlighting an available space on a graphical representation of a shelf, a bounding box enclosing an available space on a shelf, a circle around an available space for placement of an item, an arrow pointing to available space for placement of instances of an item, a colored bar or band placed beneath a space available for placement of items (underlining the space), brackets partially enclosing an available space, etc.

The color-coded indicators in other embodiments include a band of colored light (band of light) on a portion of a shelf edge display device highlighting or indicating a portion of a shelf associated with the location of items to be removed or moved off the shelf or indicating a portion of a shelf where one or more items or instances of an item should be placed in accordance with the new item configuration.

The color-coded indicators are generated in one or more colors associated with one or more instructions to move, remove, or add one or more items to a shelf or other portion of a modular display. In these embodiments, indicators associated with items to be removed are provided in a color that is different than the color of indicators used to indicate items to be added to the modular display. In a non-limiting example, a color-coded indicator(s) for items to be removed from the modular display are red, the color-coded indicator(s) for items to be moved are presented in yellow or orange, and the color-coded indicator(s) for items to be added are presented in green or blue.

In another embodiment, the color-coded indicators for items to be removed and moved are red and the color-coded indicators for items to be added are presented in green. In this example, when an item is being relocated, the indicator is red while the items are in the original configuration location and the indicator changes to green identifying the new configuration location. However, the embodiments are not limited to color-coded indicators that are red and green. The color-coded indicators may be any user-configurable color for indicating items to be removed, moved, and added to the modular display in real-time during modular display item reconfiguration.

The graphical instructions 106 are optionally presented to the user via the plurality of shelf edge display devices 112 in some embodiments. In other embodiments, the graphical instructions 106 are presented to the user via both the user device 132 UI 134 and one or more of the display devices in the plurality of shelf edge display devices 112.

The cloud server 122 is a logical server providing services to the computing device 102 or other clients, such as, but not limited to, the user device 132. The cloud server 122 is hosted and/or delivered via the network 124. In some non-limiting examples, the cloud server 122 is associated with one or more physical servers in one or more data centers. In still other examples, the cloud server 122 is associated with a distributed network of servers.

In this example, the cloud server 122 provides a remote data store for storing configuration data, such as, but not limited to, one or more configuration(s) 140 for storing current 138 configurations of one or more modular displays and new 142 or future configurations for the one or more modular displays.

The system 100 can optionally include a data storage device 144 for storing data, such as, but not limited to reconfiguration instructions 146 for reconfiguring the modular display from the current 138 configuration to a new 142 configuration. The reconfiguration instructions 146 include instructions identifying a set of one or more items to be removed 148, a set of one or more items to be moved 150 and/or a set of one or more items to be added 152 to the modular display in accordance with the new 142 configuration. In other words, the reconfiguration instructions identify the differences between the current configuration and a new configuration. The reconfiguration instructions identifies items to remove from the modular display, items to move (rearrange) on the modular display, and/or items to add to the modular display.

The data storage device 144 can include one or more different types of data storage devices, such as, for example, one or more rotating disks drives, one or more solid state drives (SSDs), and/or any other type of data storage device. The data storage device 144 in some non-limiting examples includes a redundant array of independent disks (RAID) array. In other non-limiting examples, the data storage device(s) provide a shared data store accessible by two or more hosts in a cluster. For example, the data storage device may include a hard disk, a redundant array of independent disks (RAID), a flash memory drive, a storage area network (SAN), or other data storage device. In other examples, the data storage device 144 includes a database, such as, but not limited to, the database 300 in FIG. 3 below.

In this example, the scanner device 130 is incorporated within a mobile user device 132. However, the embodiments are not limited to a scanner device incorporated within the user device 132. In other embodiments, the scanner device 130 is a stand-alone device which transmits the ID 126 to the reconfiguration manager 104.

FIG. 2 is an exemplary block diagram illustrating a system 200 for generating sequential graphical reconfiguration instructions to reconfigure a modular display. In the example of FIG. 2, the computing device 102 represents any device executing computer-executable instructions 204 (e.g., as application programs, operating system functionality, or both) to implement the operations and functionality associated with the computing device 102. In some embodiments, the computing device 102 has at least one processor 206 and a memory 208. The computing device 102, in other embodiments includes a user interface device 210.

The processor 206 includes any quantity of processing units and is programmed to execute the computer-executable instructions 204. The computer-executable instructions 204 are performed by the processor 206, performed by multiple processors within the computing device 102 or performed by a processor external to the computing device 102. In some examples, the processor 206 is programmed to execute instructions such as those illustrated in the figures (e.g., FIG. 14, FIG. 15, FIG. 16, FIG. 17, and FIG. 18).

The computing device 102 further has one or more computer-readable media such as the memory 208. The memory 208 includes any quantity of media associated with or accessible by the computing device 102. The memory 208 in these examples is internal to the computing device 102 (as shown in FIG. 1). In other examples, the memory 208 is external to the computing device (not shown) or both (not shown).

The memory 208 stores data, such as one or more applications. The applications, when executed by the processor 206, operate to perform functionality on the computing device 102. The applications can communicate with counterpart applications or services such as web services accessible via a network 124. In an example, the applications represent downloaded client-side applications that correspond to server-side services executing in a cloud.

In other embodiments, the user interface device 210 includes a graphics card for displaying data to the user and receiving data from the user. The user interface device 210 can also include computer-executable instructions (e.g., a driver) for operating the graphics card. Further, the user interface device 210 can include a display (e.g., a touch screen display or natural user interface) and/or computer-executable instructions (e.g., a driver) for operating the display. The user interface device 210 can also include one or more of the following to provide data to the user or receive data from the user: speakers, a sound card, a camera, a microphone, a vibration motor, one or more accelerometers, a BLUETOOTH® brand communication module, wireless broadband communication (LTE) module, global positioning system (GPS) hardware, and a photoreceptive light sensor. In a non-limiting example, the user inputs commands or manipulates data by moving the computing device 102 in one or more ways.

The network 124 is implemented by one or more physical network components, such as, but without limitation, routers, switches, network interface cards (NICs), and other network devices. The network 124 is any type of network for enabling communications with remote computing devices, such as, but not limited to, a local area network (LAN), a subnet, a wide area network (WAN), a wireless (Wi-Fi) network, or any other type of network. In this example, the network 124 is a WAN, such as the Internet. However, in other embodiments, the network 124 is a local or private LAN.

In some embodiments, the system 200 optionally includes a communications interface device 214. The communications interface device 214 includes a network interface card and/or computer-executable instructions (e.g., a driver) for operating the network interface card. Communication between the computing device 102 and other devices, such as but not limited to the user device 132 and/or one or more shelf edge display device(s) 216, can occur using any protocol or mechanism over any wired or wireless connection. In some embodiments, the communications interface device 214 is operable with short range communication technologies such as by using near-field communication (NFC) tags. In this example, the reconfiguration manager 104 obtains reconfiguration instructions 222 from a cloud server or other data source via the communications interface device 214.

The user device 132 represents any device executing computer-executable instructions. The user device 132 can be implemented as a mobile computing device, such as, but not limited to, a wearable computing device, a mobile telephone, laptop, tablet, computing pad, netbook, gaming device, and/or any other portable device. The user device 132 includes at least one processor 218 and a memory 220. The user device 132 can also include a UI 134 for displaying reconfiguration data, such as, but not limited to, a modular display graphic 224.

A reconfiguration application 240 on the memory 220 receives the graphical instructions 230 for reconfiguring the modular display. The reconfiguration application 240 renders the modular display graphic 224 with the color-coded indicators and/or item images to guide the user in reconfiguring the modular display from the current configuration to the new configuration. The reconfiguration application 240 obtains the user confirmation that each step in the process of removing items, moving items, and adding new items to the modular display are completed in sequence in accordance with the graphical instructions 230.

The modular display graphic 224 is a graphic representing a modular display. The modular display graphic 224 includes a graphical representation of a set of shelves on the modular display and the items on the modular display. In this example, the modular display graphic 224 includes at least one image of each item currently on the modular display, at least one image of each item to be relocated (moved) on the modular display, and/or at least one image of each item to be added to the modular display in accordance with the new configuration. In some embodiments, the modular display graphic 224 includes color-coded indicators indicating which items to remove, which items to move and which items to add to the modular display. The images of the items are depicted within the modular display graphic at the approximate location on the modular display.

The system 100 can optionally include a data storage device 226 for storing data, such as, but not limited to, the data storage device 144 in FIG. 1. The data storage device 226 can include one or more different types of data storage devices, such as, for example, one or more rotating disks drives, one or more solid state drives (SSDs), and/or any other type of data storage device. The data storage device 226, in some non-limiting examples, includes a redundant array of independent disks (RAID) array. In other non-limiting examples, the data storage device 226 provide a shared data store accessible by two or more hosts in a cluster. For example, the data storage device may include a hard disk, a redundant array of independent disks (RAID), a flash memory drive, a storage area network (SAN), or other data storage device. In other examples, the data storage device 226 includes a database.

The data storage device 226, in this example, is included within the computing device 102, attached to the computing device, plugged into the computing device, or otherwise associated with the computing device 102. In other examples, the data storage device 226 includes a remote data storage accessed by the computing device via the network 124, such as a remote data storage device, a data storage in a remote data center, or a cloud storage.

The data storage device 226 stores configuration data 114, including graphical instructions for reconfiguring items on a modular display, such as, but not limited to, the modular display 108 in FIG. 1. The graphical instructions 230 include color-coded indicators 120 and/or item image(s) 118. The color-coded indicators 120 include any type of indicators for identifying or highlighting one or more item image(s) 118 in the modular display graphic 224 and/or identifying/highlighting an area on a shelf assigned for placement of one or more items in accordance with a new configuration of the items on the modular display.

The color-coded indicators can include highlighting overlaid on an item image in a modular display graphic rendered on a UI, a colored light band on a shelf edge display device, a bounding box placed around an image of one or more items in a modular display graphic, an arrow pointing to an item or area on a shelf, a circle around an image of an item, or any other type of indicator used to identify an item in a graphic or via a shelf edge display.

The memory 108 in some embodiments stores a reconfiguration manager, that when executed by the processor 206 of the computing device 102, generates optimized reconfiguration instructions 222 for reconfiguring a portion of a selected modular display. In other embodiments, the reconfiguration manager obtains the reconfiguration instructions 222 from a cloud server via the network 124. In this example, the reconfiguration instructions 222 are stored on a data storage device 144 until reconfiguration of the portion of the selected modular display is begun.

The reconfiguration instructions 222 include graphical instructions 230 for sequentially reconfiguring the modular display from a first configuration of items to a second configuration of items on the modular display. The reconfiguration instructions 144 include step-by-step instructions for sequentially removing one or more instances of one or more items from the modular display, moving one or more instances of one or more items on the modular display from a first location to a second location, and/or adding one or more instances of one or more items to the modular display with the fewest number of item removals and item additions for optimized reconfiguration of the display. This minimizes time and effort expended by human users during the reconfiguration process.

The reconfiguration manager 104 generates a first set of graphical instructions based on the reconfiguration instructions. The first set of graphical instructions are presented to a user via the UI 134 of the user device 132 and/or one or more shelf edge display device(s) 216 on the modular display. The first set of graphical instructions identify a first set of items in the plurality of items to be removed from the modular display.

If the reconfiguration manager 104 receives confirmation indicating removal of the first set of items from the modular display is complete, the reconfiguration manager 104 generates a second set of graphical instructions based on the reconfiguration instructions 222. The second set of instructions are presented to the user via the UI 134 and/or one or more shelf edge display device(s) 216. The second set of graphical instructions identify a second set of items in the plurality of items to be relocated from an original (first) location in accordance with the first configuration to a new (second) location in accordance with the new configuration.

If the reconfiguration manager receives confirmation from the user indicating relocation of the second set of items on the modular display is done, the reconfiguration manager 104 generates a third set of graphical instructions based on the reconfiguration instructions 222. The third set of graphical instructions are presented to the user via the UI 134 of the user device 132 and/or one or more shelf edge display device(s) 216. The third set of graphical instructions identify a third set of items to be added to the modular display for efficient reconfiguration of the modular display from the first configuration to the second configuration. If the reconfiguration manager 104 receives confirmation that the new items have been added to the modular display, the reconfiguration manager 104 updates a status 238 of the modular display reconfiguration. In this example, the status 238 is updated as complete upon receiving user confirmation of completion of the third set of graphical instructions for adding items to the modular display. The status update includes identifying the new item configuration on the modular display as the now current item configuration after the reconfiguration is confirmed as completed.

In some embodiments, the shelf edge display device(s) 216 light up a color-coded indicator, such as a light band 232 associated with an item facing 234 for an item to be placed on a portion of a shelf and/or an item to be removed from a portion of a shelf. For example, a red-colored light band lights up along the length of an item facing corresponding to an area on a shelf assigned to an item to be removed. The red light band is lit until the user confirms that all instances of the item corresponding to that area of the shelf has been removed from the shelf.

In another example, a green-colored light band lights up along the length of the item facing for an area of a shelf assigned to an item to be relocated to the area of the shelf corresponding to the green-colored light band or an area of the shelf assigned to a new item to be added to the area of the shelf corresponding to the green-colored light band. In this manner, the color-coded indicators (light bands) guide the user to remove items, move items, and add items to the correct locations on the shelves of the modular display.

Figure 3:
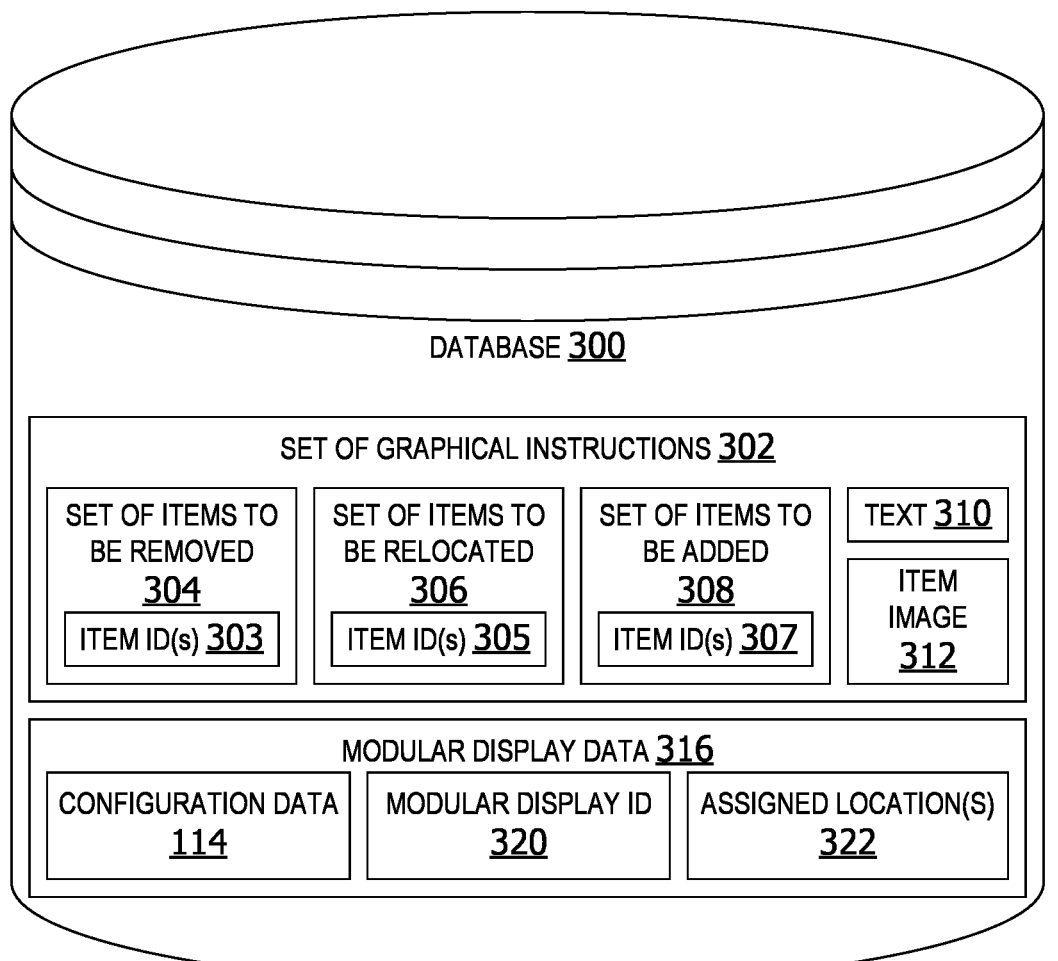
FIG. 3 is an exemplary block diagram illustrating a database for storing configuration data for reconfiguring a modular display.

FIG. 3 is an exemplary block diagram illustrating a database 300 for storing configuration data for reconfiguring a modular display. In some embodiments, the database 300 is associated with a data storage device, such as, but not limited to, the data storage device 144 in FIG. 1 and/or the data storage device 226 in FIG. 2. In other embodiments, the database 300 is a database on a cloud storage, such as, but not limited to, a data store associated with the cloud server 122 in FIG. 1. The database 300 in this non-limiting example is a relational database. However, in other examples, the database 300 may be implemented as any type of database.

The database, in this example, stores a set of graphical instructions 302 including one or more item identifiers (IDs) 303 for a set of one or more items to be removed 304 from the modular display, one or more item IDs 305 for a set of one or more items to be relocated 306 on the modular display, and/or one or more item IDs 307 for a set of one or more items to be added 308 to the modular display. The set of graphical instructions optionally includes text 310 instructions, color-coded indicator(s) and/or an item image 312 for each item to be removed, moved and/or added.

In other embodiments, the database 300 includes modular display data 316, such as, but not limited to, configuration data 114, modular display ID 320 and/or assigned location(s) 322 of items. The modular display ID 320 is a unique identifier associated with each modular display. The modular display ID 320 is obtained from an ID tag on a portion of the modular display, such as, but not limited to, the tag 228 in FIG. 1. In some embodiments, the user scans the tag using a scanner device to obtain the modular display ID. The ID is then used to retrieve reconfiguration instructions for reconfiguring the modular display from the current item configuration to a new item configuration from a data storage device or a cloud server, such as, but not limited to, the cloud server 122 in FIG. 1.

Figure 4:
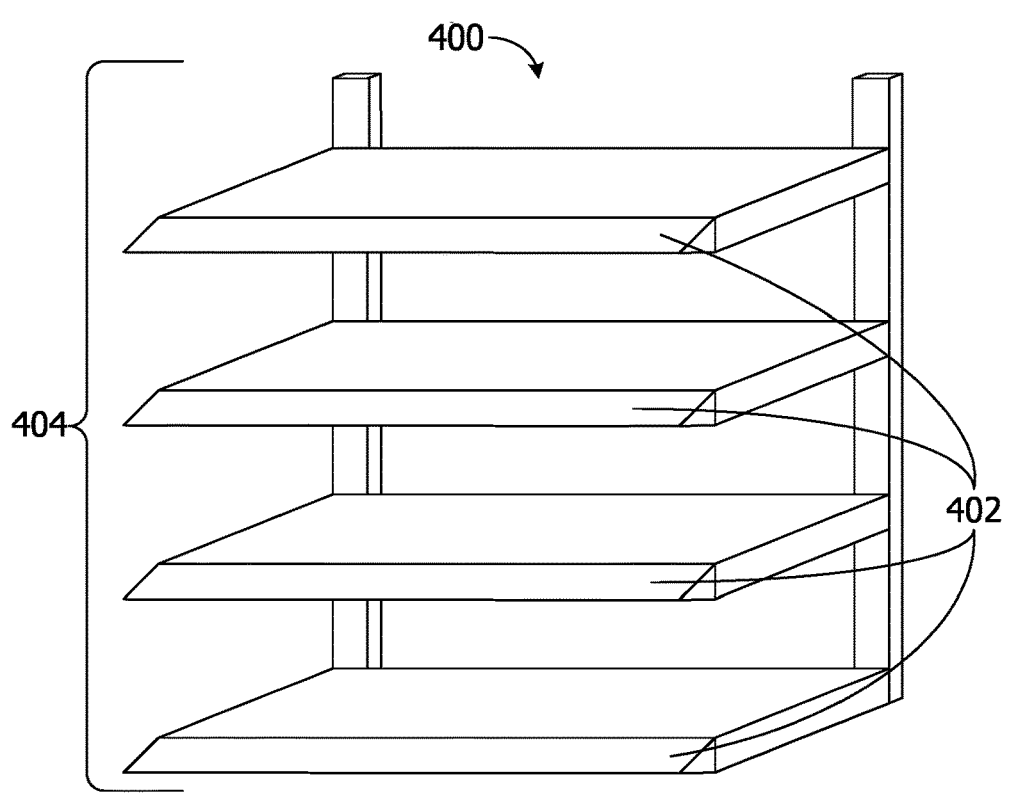
FIG. 4 is an exemplary block diagram illustrating a modular display including a plurality of shelf edge display devices displaying sequential graphical instructions for reconfiguring the modular display.

Referring now to FIG. 4, an exemplary block diagram illustrating a modular display 400 including of shelf edge display devices 402 displaying sequential graphical instructions for reconfiguring the modular display 400. The modular display 400 in this example includes a plurality of shelves 404 for displaying an item assortment in accordance with a planogram. The shelf edge display devices 402 display color-coded indicators and item graphics guiding a user during reconfiguration of items on the modular display 400. In this example, there are no items shown on the plurality of shelves 404. The embodiments are not limited to empty shelves. In other embodiments, the shelves are fully stocked with an assortment of items. In still other embodiments, the plurality of shelves 404 are partially stocked with one or more items.

Figure 5:
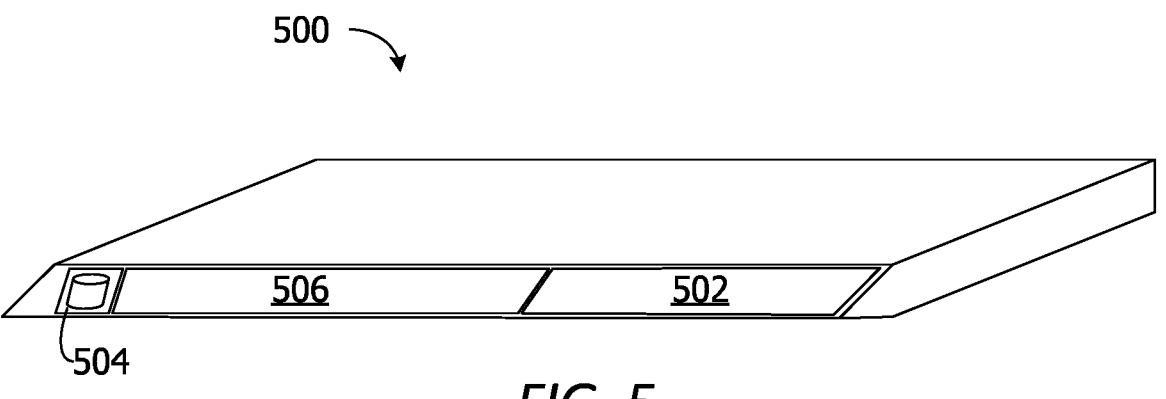
FIG. 5 is an exemplary block diagram illustrating a shelf having a shelf edge display device displaying a color-coded light band and an item image corresponding to an item to be placed on a portion of the shelf.

FIG. 5 is an exemplary block diagram illustrating a shelf 500 having a shelf edge display device 502 displaying a color-coded light band 506 and an item image 504 corresponding to an item to be placed on a portion of the shelf 500. The shelf 500 is a shelf in a plurality of shelves on a modular display, such as, but not limited to, the modular display 400 in FIG. 4.

The shelf edge display device 502 is a shelf display device for displaying data, such as, but not limited to, a digital tag or digital display removably attached to the shelf edge. In this example, the shelf edge display device 502 is a device receiving power from a wired power source associated with the shelf 500. However, in other embodiments, the shelf edge display device 502 is a battery powered display device. The shelf edge display device includes any type of display screen, such as, but not limited to, a liquid crystal display (LCD) screen, cathode ray tube (CRT) screen, touch screen, or any other type of display screen.

In this example, the light band 506 is a green color-coded indicator identifying an area on a portion of the shelf 500 for placement of one or more items to be relocated onto the shelf from a different shelf on the modular display or for addition of one or more new items onto the modular display. However, the embodiments are not limited to a green light band 506. In other embodiments, the light band 506 can be a blue light band, or any other color light band. In this example, the light band 506 is a steady band of colored light expanding across the length of the item facing area assigned to an item to be placed on the shelf 500. However, the embodiments are not limited to a steady light band. In other embodiments, the light band is a flashing light.

In this example, the color-coded indicator is a solid band of light. However, in other embodiments, the color-coded indicator displayed on the shelf edge display device 502 is a graphic image of one or more arrows pointing up towards the available surface of the shelf 500 or any other type of graphic indicator.

The shelf edge display device 502 includes an item image 504 of the new item assigned to be placed on a portion of the shelf 500 in accordance with a new item configuration. The item image 504 is a graphic representation or graphic image of the item assigned to be displayed on a portion of the shelf 500. In this example, a single item image 504 of a single item is presented. In other examples, two or more images of the item to be placed on the shelf 500. In still other examples, the shelf edge display device 502 displays multiple item images for one or more items to be moved, removed and/or added to the shelf 500.

Figure 6:
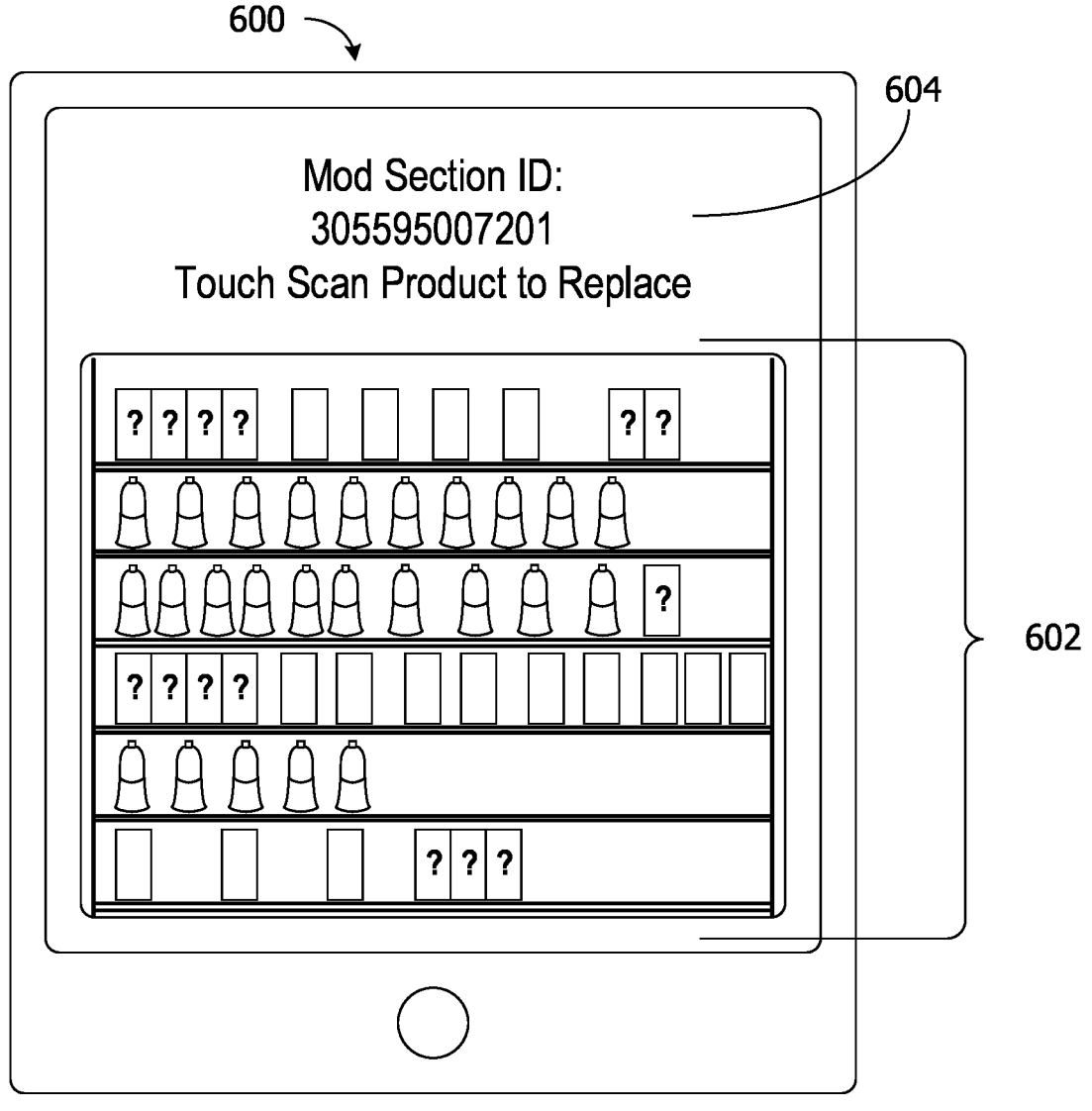
FIG. 6 is an exemplary block diagram illustrating a user device displaying a modular display graphic including item images for items to be removed, moved and/or added to the modular display.

Turning now to FIG. 6, an exemplary block diagram illustrating a user device 600 displaying a modular display graphic 602 including item images for items to be removed, moved and/or added to the modular display is shown. The user device 600 is a computing device, such as, but not limited to, the user device 132 in FIG. 1 and FIG. 2.

In this example, the graphical instructions 604 includes a modular display ID number and a text instruction to remove or replace items on the modular display. The modular display graphic includes item graphics for items on the modular display and color-coded indicators associated with items to be removed, moved and/or added to the modular display. In this example, the color-coded indicators include indicators having a box enclosing a question mark to identify locations of items being moved, removed, or added to the modular display.

The modular display in this example is a set of shelves having items sitting on a top surface of each shelf. However, the embodiments are not limited to a set of shelves supporting a plurality of items. In other embodiments, the modular display includes clothing racks, hooks on a peg board, wall mounted shelves, an end-cap display, or any other type of item display.

Figure 7:
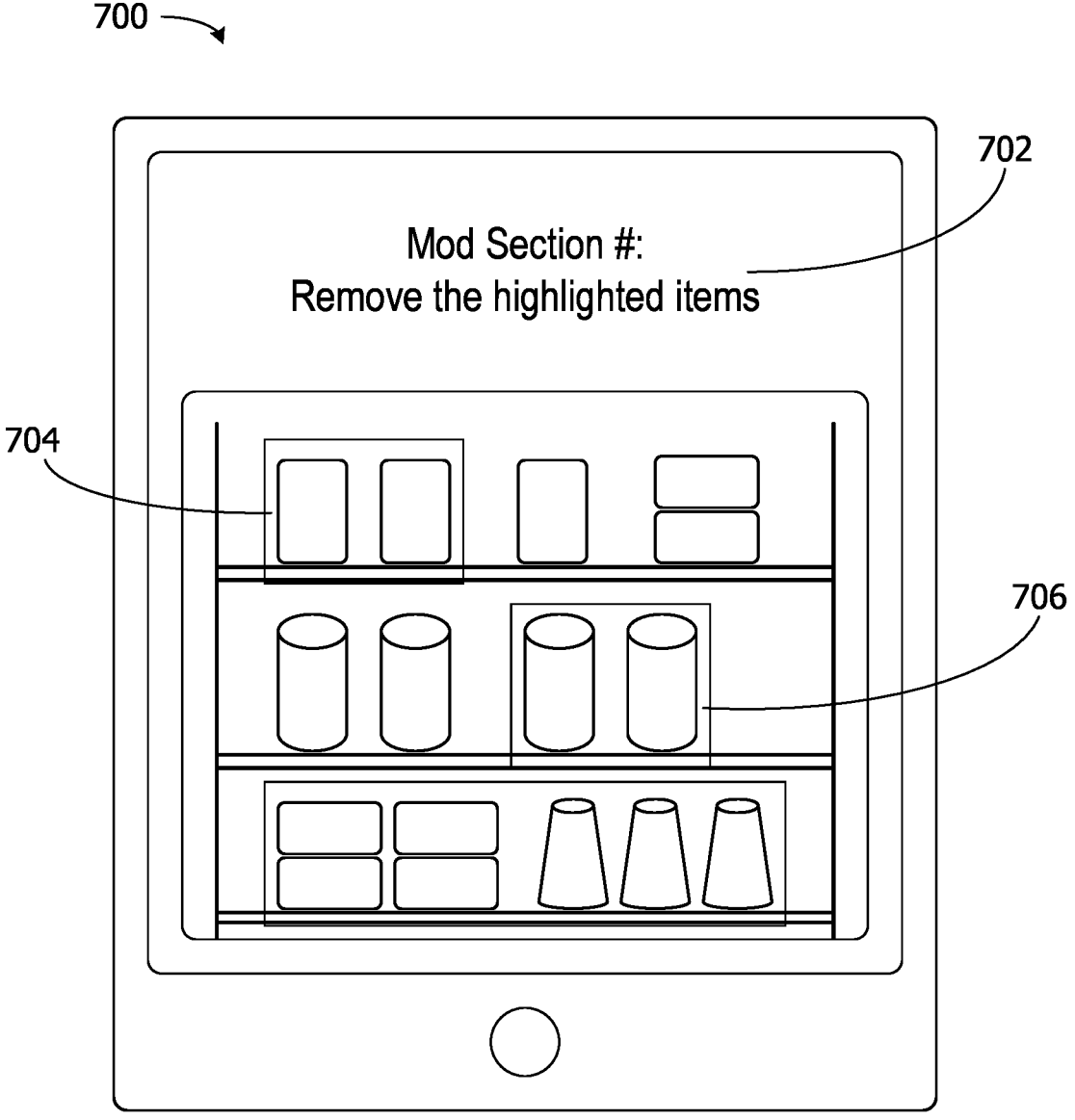
FIG. 7 is an exemplary block diagram illustrating a user device displaying a portion of a modular display including color-coded indicators highlighting items to be removed from the modular display.

FIG. 7 is an exemplary block diagram illustrating a user device 700 displaying a portion of a modular display including color-coded indicators highlighting items to be removed from the modular display. The user device 700 is a computing device, such as, but not limited to, the user device 132 in FIG. 1 and FIG. 2.

In this example, the UI of the user device 700 presents a modular display graphic 702 including a graphical representation of each item on the modular display. The item images of the items to be removed from the modular display are associated with a color-coded indicator. In this example, the color-coded indicator is a rectangular bounding box enclosing each item image representing an item to be removed from the modular display. The color-coded indicator includes a color highlight overlaid over the item images and highlighting the item images in a color associated with to items to be moved or removed from the modular display, such as a red color, yellow color, or an orange color. However, the examples are not limited to a color-coded indicator that is red, yellow, or orange. The color-coded indicator for items to be removed from the modular display may be any user-selected color.

In this example, the color-coded indicators are associated with items 704 on a first shelf and items 706 on a second shelf to be removed from the modular display. In other embodiments, the color-coded indicators are associated with the item images of items to be moved to a different location on the modular display or items to be added to the modular display.

The modular display graphic, in this example, shows items on a first shelf to be removed and items from a second shelf to be removed from the modular display. However, the embodiments are not limited to removing items from two shelves. The modular display graphic with color-coded indicators can include items to be removed from a single shelf, as well as items to be removed from three or more shelves on a modular display.

Figure 8:
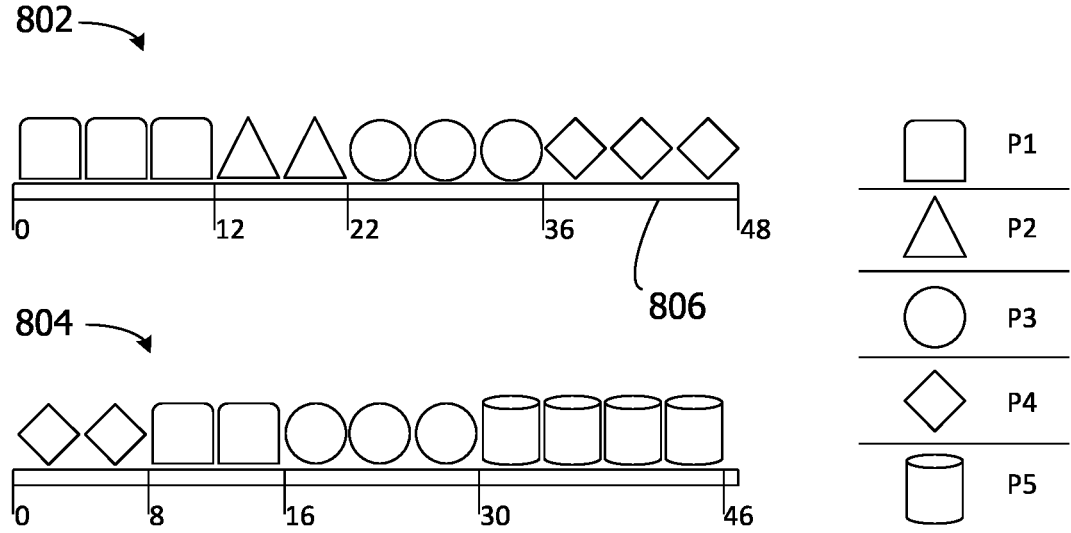
FIG. 8 is an exemplary block diagram illustrating a current item configuration and a new item configuration for a shelf.

Turning now to FIG. 8, an exemplary block diagram illustrating a current item configuration 802 and a new item configuration 804 for a shelf 806 is shown. The shelf is a portion of a shelf on a modular display. The reconfiguration manager identifies differences between the current configuration (current modular layout) and the new configuration (upcoming layout). The reconfiguration manager classifies each item in the layout as an item to be removed, an item to be moved, or an item to be added.

A product group is a set of one or more instances of an item. All instances of the same variety or type of product are included in the same product group. A product group is a set of one or more instances of an item on the shelf 806 with one or more facings. For example, a first product group can include bottles of regular variety ketchup, a second product group can include bottles of sugar-free variety of the same brand of the ketchup, and a third product group can include bottles of organic ketchup. In this example, a first product group (P1) group is shown on a portion of the shelf 806 in accordance with the current configuration. A second product group (P2), a third product group (P3) and a fourth product group (P4) are also included in the current configuration. A fifth product group (P5) is not included in the current configuration but is included in the new configuration.

The reconfiguration manager includes an algorithm that goes through each shelf in each section in the modular category and references both the current shelf layout and the upcoming shelf layout. For a given shelf on a given section, the reconfiguration manager finds the number of facings of each product group, the x-position of each product group, and the widths of each product group in the current configuration 802 and the new configuration 804.

A facing refers to an item (product) on the shelf 806 which is facing a customer or other user viewing the shelf. If there are three instances of a given item positioned at the front of the shelf such that the item instances are in full view of a user viewing the shelf, the three instances of the item are facings of the item. Other instances of the item located behind the front facing instances of the item are not visible or only partially visible behind the front facing items. In this example, the second product group (P2) has a facing of two and the third product group (P3) has a facing of three.

The x-position of an item or product group refers to the location of the item on the shelf. The x-position indicates a distance from one end of the shelf. In this example, the x-position is the distance of the location of the item from the left side or left edge of the shelf. However, the embodiments are not limited to an x-position measured or calculated from the left edge of the shelf. In other embodiments, the x-position includes a distance of the item from a right edge of the shelf. In this example, the second product group (P2) is located at the x-position 12 moving from left to right.

The width of the product group is the width of the item facing. If the item facing include two instances of the item, the width of the product group is the width of two instances of the item when placed on the shelf. In this example, the second product group (P2) width is 10 units, spanning from the x-position 12 to the x-position 22. The width of the third product group (P3) is 14 units, spanning from the x-position 22 to the x-position 36.

The reconfiguration manager identifies product removes processing from the left to the right. The reconfiguration manager compares the product groups in the current and upcoming layouts to see if they both have the same product groups in each. Any product group which appears in the current configuration 802 which is absent from the new configuration 804 is identified as an item to be removed, as shown in FIG. 9 below.

Figure 9:
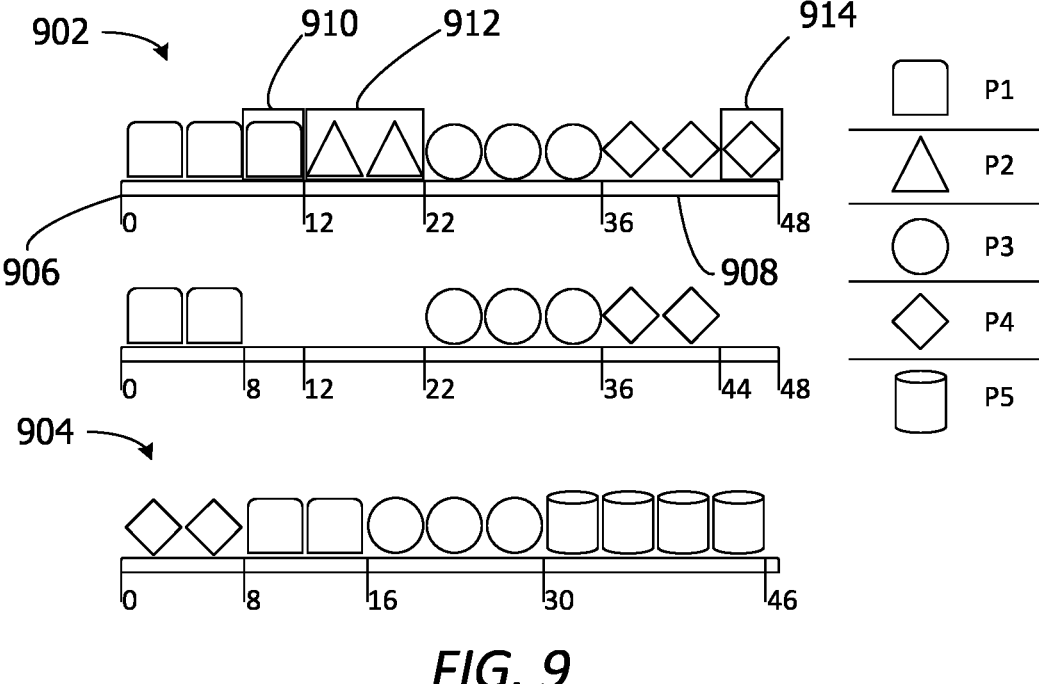
FIG. 9 is an exemplary block diagram illustrating identification of items to be removed from a shelf during reconfiguration of the items on the shelf.

FIG. 9 is an exemplary block diagram illustrating identification of items to be removed from a shelf during reconfiguration of the items on the shelf. If a product group is present in the current configuration 902 and absent from the new configuration 904, the product group is scheduled to be removed from the upcoming planogram and is marked as remove.

In some examples, the reconfiguration manager compares the number of facings for each product group to see if the number of facings in each group is being reduced in the upcoming layout. If there is a reduction in any of the facings from the current configuration 902 to the new configuration 904, they are extra facings, and are marked as remove starting from the right side 906 of the shelf 908.

In this example, the second product group (P2) is not found in the new configuration 904, and thus marked as remove via an indicator. In this example, a single instance of an item in the first product group (P1) facing is associated with an item remove indicator 910, both instances the item in the second product group (P2) is associated with the item remove indicator 912, and a single instance of the item associated with the fourth product group (P4) is associated with a remove indicator 914. In this example, items marked for removal are enclosed within a box, such as a rectangle. In other embodiments, the set of items to be removed is shown with a color-coded highlight, such as a red highlight superimposed over the name, item ID and/or image of the item(s) to be removed. In such case, the second product group (P2) the box enclosing the second product group would include red highlight within the box.

The number of facings for the first product group (P1) and the fourth product group (P4) are both reduced from 3 to 2, so an extra facing (item instance) needs to be removed for each. The farthest right facing in both the first product group (P1) and the fourth product group (P4) are marked as remove. In an example, the item instances to be removed are shown with red highlight below. However, the embodiments are not limited to red highlights. In other examples, the item instances to be removed are enclosed in a box, identified by an arrow, circled, or any other type of indicator for marking items to be removed.

Figure 10:
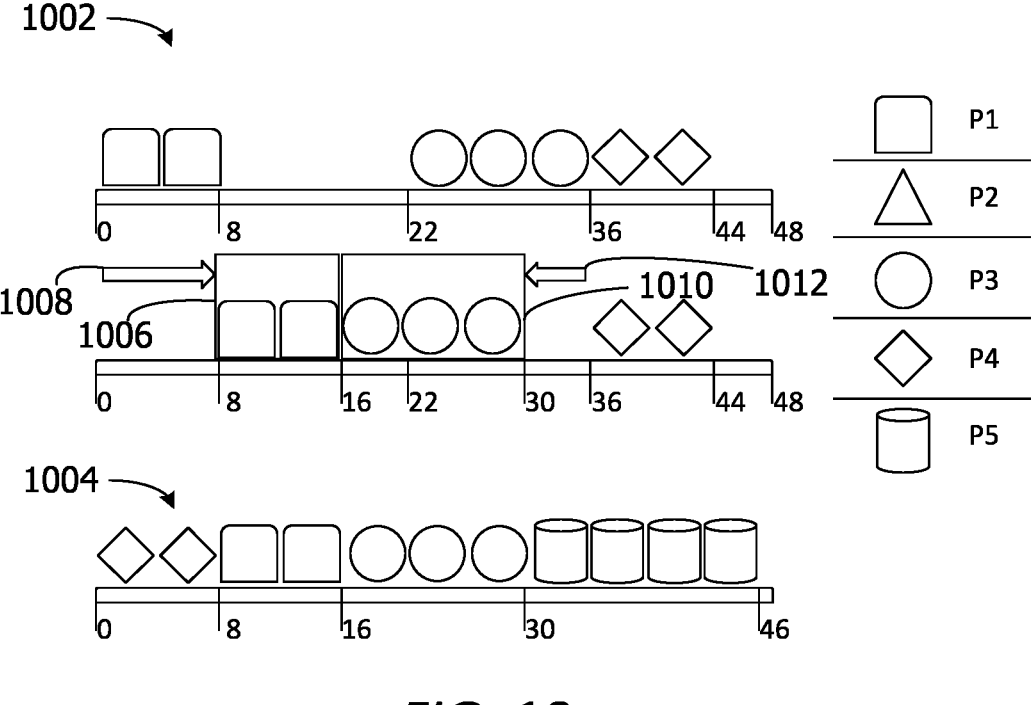
FIG. 10 is an exemplary block diagram illustrating identification of item moves during a reconfiguration of the items on the shelf.

FIG. 10 is an exemplary block diagram illustrating identification of item moves during a reconfiguration of the items on a shelf. In this example, the reconfiguration manager identifies item moves by processing potential removal of items and movements of items on the shelf going from the left side of the shelf to the right side of the shelf. The reconfiguration manager compares the product group x-positions in the current configuration 1002 and a new configuration 1004 to see if any product groups have different positions in the new configuration 1004.

For product groups that have different positions, the reconfiguration manager checks if the x-positions of the current configuration are lower than x-positions of the items in the upcoming new configuration. If the x-position is lower in the current configuration 1002 than in the new configuration 1004, those product groups should move towards the right on the shelf and be marked as move right, provided there is nothing currently in the space it needs to occupy. An instance of an item is marked as a move right via an indicator, such as, but not limited to, an indicator box 1006 and/or an indicator arrow 1008.

If the x-position is not lower in the current configuration 1002 than in the new configuration 1004, those product groups should move towards the left on the shelf and marked as move left, provided there is nothing currently in the space it needs to occupy. In some examples, instances of an item are marked to move left via an indicator box 1010 and/or an indicator arrow 1012.

In this example, the x-position (0.0) of the first product group (P1) in the current configuration is lower than its x-position of (8.0) in the new configuration and there is nothing currently in the space it needs to occupy, so the product group moves in the updated position to the right, as indicated by the indicator box 1006 and the indicator arrow 1008. Similarly, the third product group (P3) moves to its updated position to the left, as it satisfies both those conditions of move as well, as shown by the indicator box 1010 and indicator arrow 1012.

In the case, there is insufficient space available to move an item to its new position because there is another item in the way, that item is added to a stack to be processed at a later time. A stack is a last-in-first-out data structure used like a stack of plates, where the last plate put away is on the top of the stack, which is the same plate taken off the stack when it is used. If all the product groups on a shelf are processed (either moved or added to the stack) and the stack still has some product groups in the stack, check if there is some space freed after processing the remaining product groups. This can be done by checking the x-positions of each product group that has a different position in the current configuration than in the new configuration. If the x-position is lower in the new configuration, those product groups are moved to the right on the shelf. If the x-position is not lower, the product groups are moved to the left on the shelf. This process is performed for each product group to determine if there was some space freed after processing the remaining product groups. If so, move the product groups accordingly, either to their updated position to the left or right. If the product groups still do not have space available to move, the product groups are marked for removal. These product groups will be added back to the shelf during the add phase, as shown in FIG. 12 and FIG. 13 below.

Figure 11:
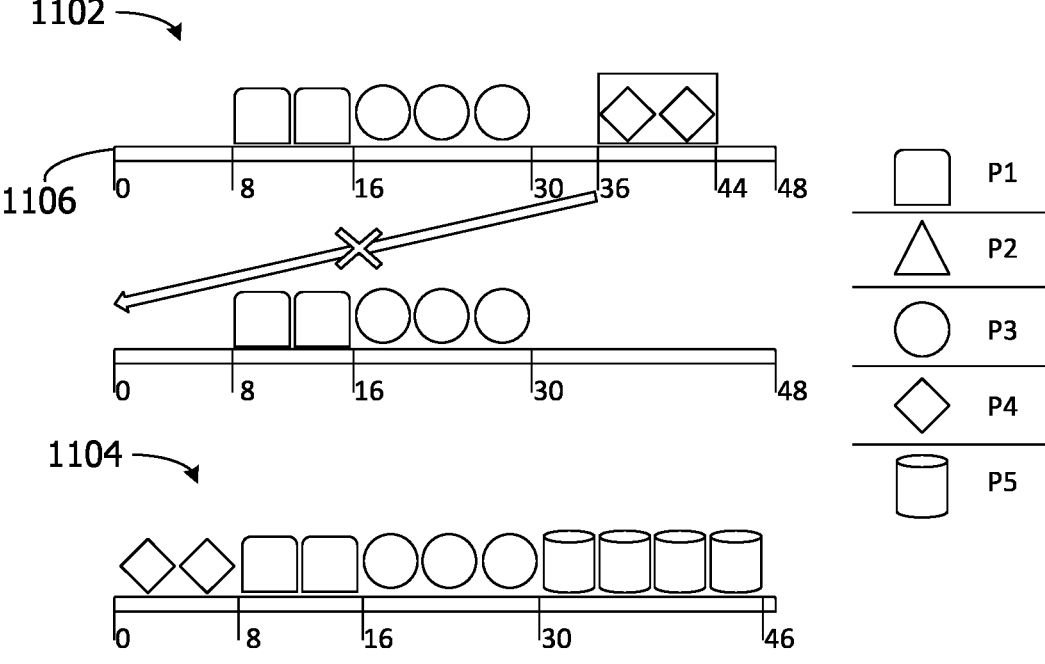
FIG. 11 is an exemplary block diagram illustrating identification of an optimal sequence of item removes and moves during reconfiguration of items on the shelf.

Referring now to FIG. 11, an exemplary block diagram illustrating identification of an optimal sequence of item removes and moves during reconfiguration of items on the shelf is shown. In this example, the fourth product group (P4) is marked as remove because it cannot move from position 36 in the current configuration 1102 to position 0 of the new configuration 1104 because other product groups and/or instances of items in the product groups on the shelf 1106 are in the way. This product group is removed and then added later.

The reconfiguration manager identifies item adds processing from the left to the right, in this example, by comparing the product groups in the current configuration 1102 and the new configuration 1104 to see if they both have the same product groups in each. If a product group is not in the current configuration 1102 item layout and is in the new configuration 1104 upcoming layout, the product group is being added to the upcoming planogram and is marked as add. The reconfiguration manager compares the number of facings for each product group to see if the number of facings in each group is being increased in the new configuration 1104. If there is an increase in any of the facings from the current configuration 1102 to the new configuration 1104, the extra facings are added, starting from the right.

Figure 12:
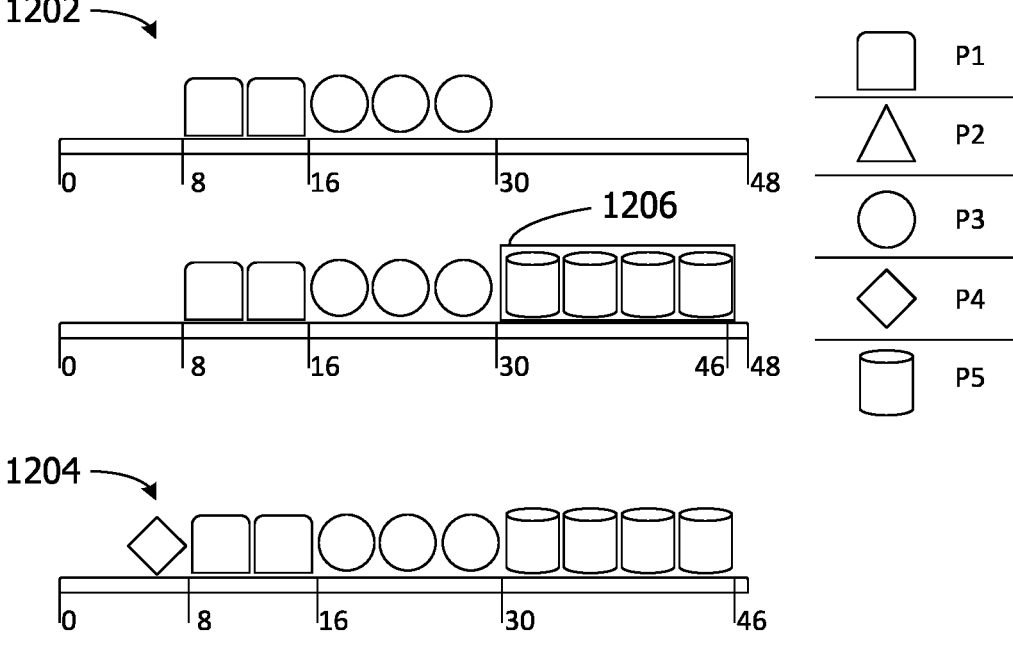
FIG. 12 is an exemplary block diagram illustrating identification of items to be added to the shelf during reconfiguration of items on the shelf.
Figure 13:
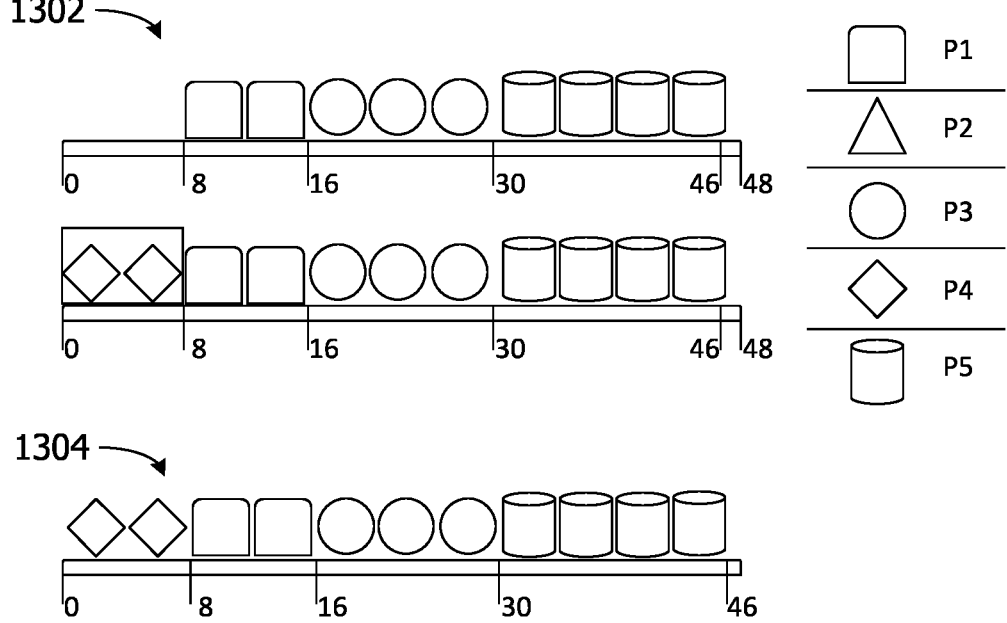
FIG. 13 is an exemplary block diagram illustrating identification of items to be both removed from the shelf and then added back onto the shelf during reconfiguration of the items on the shelf.

FIG. 12 is an exemplary block diagram illustrating identification of items to be added to the shelf during reconfiguration of items on the shelf. In this example, a fifth product group (P5) is absent from the current configuration 1202 and present in the new configuration 1204, and thus marked as an add. In this example, the fifth product group is marked as an add with a box 1206. In some examples, the box 1206 includes a green highlight. The items which were present in both the new configuration and the current configuration which were removed due to spacing considerations are now marked as adds, ensuring these items are returned to the shelf in the correct locations.

FIG. 13 is an exemplary block diagram illustrating identification of items to be both removed from the shelf and then added back onto the shelf during reconfiguration of the items on the shelf. In this example, the fourth product group (P4) was included in both the current configuration 1302 and the new configuration 1304. The fourth product group (P4) was removed because it could not be moved since there were other product groups in the way. The fourth product group (P4) is added back onto the shelf after all item removals and item moves are completed.

To ensure an optimal solution with the least number of steps for users reconfiguring the modular display, the system iteratively predicts various sequences of item removals, moves and additions until the most optimal sequence of steps is identified which requires the fewest number of item removals and item additions for the same shelf. The system processes the item removals, moves, and additions from right-to-left to determine the number of item removals and item additions. The system processes the item removals, moves and additions again from left-to-right across the shelf to determine the number of item removals and item additions. The sequence of item removals, moves, and additions having the fewest number of addition and removal changes is selected to reduce the number of required removes and adds.

In other examples, the system selects the process (either left-to-right or right-to-left) that has the lowest total number of additions and removals. This minimizes the number of additions and removals while reducing the overall time required by users to complete modular display reconfiguration because adds and removes are the most time-consuming steps required.

Figure 14:
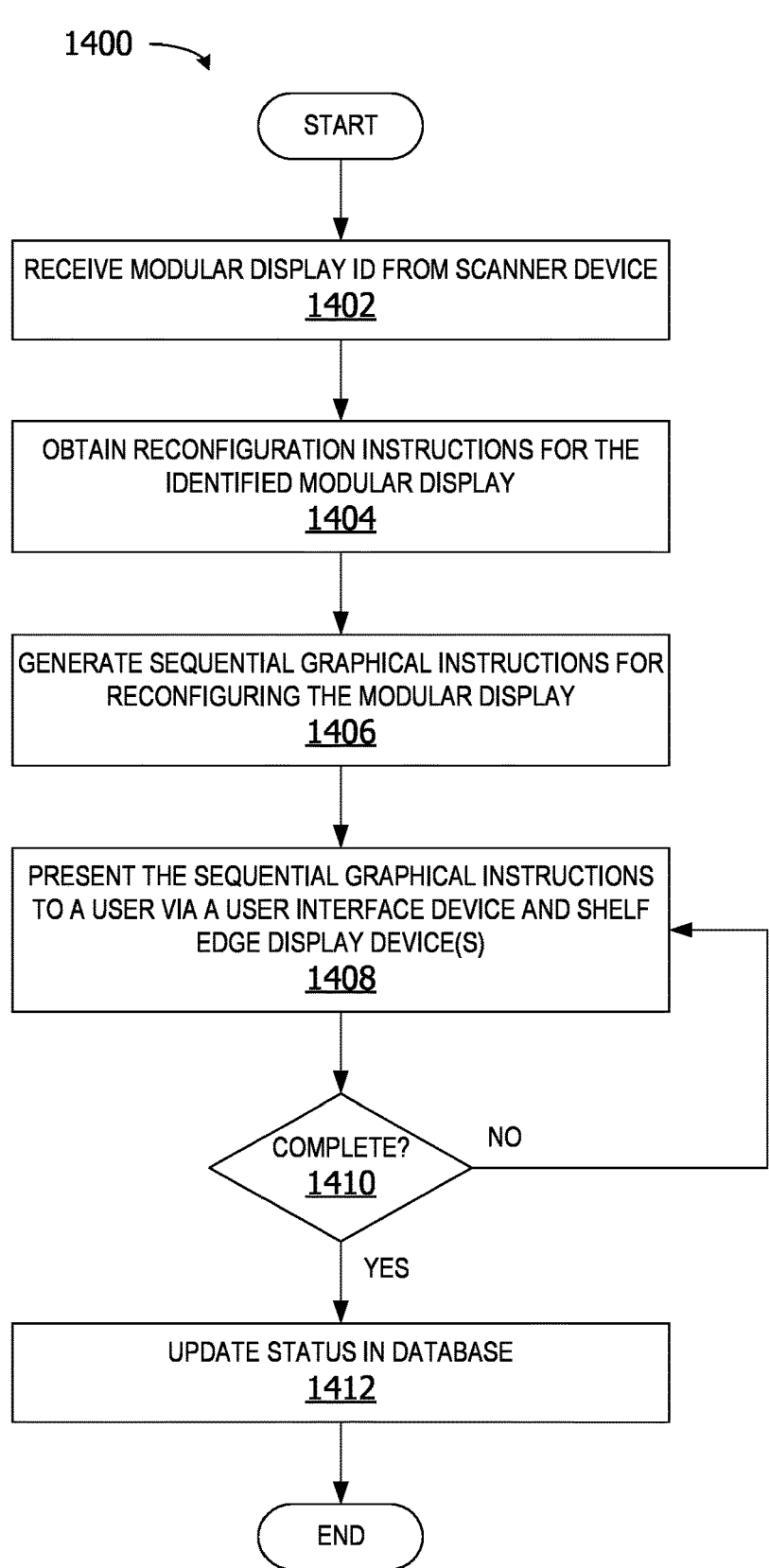
FIG. 14 is an exemplary flow chart illustrating operation of the computing device to provide modular display reconfiguration guidance in real-time using sequential graphical instructions.

FIG. 14 is an exemplary flow chart illustrating operation of the computing device to provide modular display reconfiguration guidance in real-time using sequential graphical instructions. The process 1400 shown in FIG. 14 is performed by a reconfiguration manager component, executing on a computing device, such as the computing device 102 or the user device 132 in FIG. 1.

The process begins by receiving a modular display identifier (ID) from a scanner device at 1402. The scanner device is a device for scanning an ID tag on a modular display, such as, but not limited to, the scanner device 130 in FIG. 1. The reconfiguration manager obtains reconfiguration instructions for the identified modular display at 1404. The reconfiguration instructions include instructions for changing a configuration of items on the modular display from the current configuration to a new configuration, such as, but not limited to, the reconfiguration instructions 146 in FIG. 1. In this example, the reconfiguration instructions are obtained from a cloud server, such as, but not limited to, the cloud server 122 in FIG. 1.

The reconfiguration manager generates sequential graphical instructions for reconfiguring the modular display at 1406. The sequential graphical instructions are generated based on the reconfiguration instructions. The reconfiguration manager presents the sequential graphical instructions to a user via a user interface device and one or more shelf edge display device(s) at 1408. The reconfiguration manager determines if the reconfiguration in accordance with the sequential graphical instructions is complete at 1410. If yes, the reconfiguration manager updates a status of the modular display in a database at 1412. The database is a database for storing data, such as, but not limited to, the database 300 in FIG. 3. The process terminates thereafter.

While the operations illustrated in FIG. 14 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 14.

Figure 15:
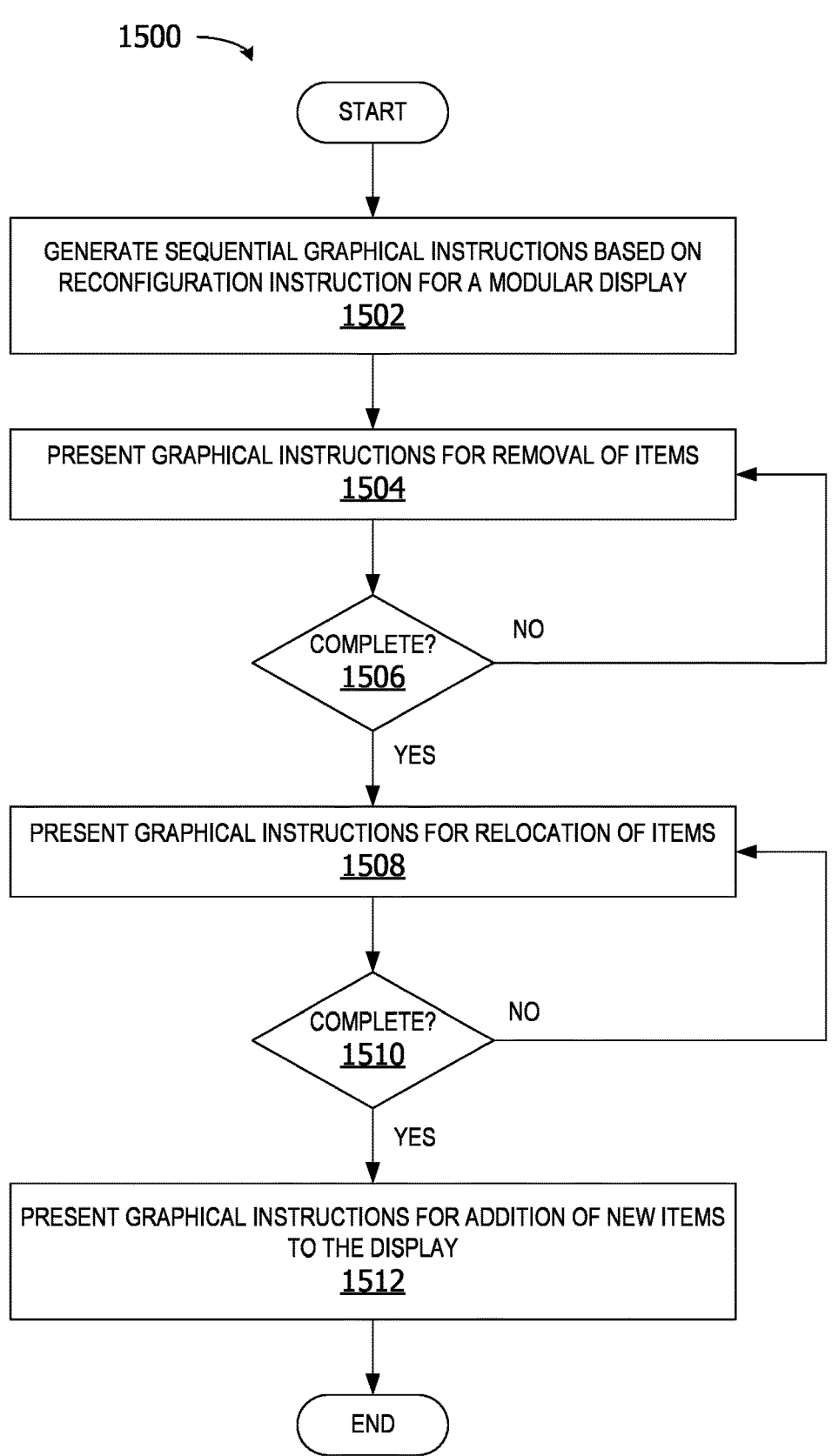
FIG. 15 is an exemplary flow chart illustrating operation of the computing device to provide instructions to remove items, move items and add new items to a modular display.

FIG. 15 is an exemplary flow chart illustrating operation of the computing device to provide instructions to remove items, move items and add new items to a modular display. The process 1500 shown in FIG. 15 is performed by a reconfiguration manager component, executing on a computing device, such as the computing device 102 or the user device 132 in FIG. 1.

The process begins by generating sequential graphical instructions based on reconfiguration instructions for a modular display at 1502. The reconfiguration manager presents graphical instructions for removal of items at 1504. The reconfiguration manager determines if removal of the items from the modular display is complete at 1506. In this example, the reconfiguration manager determines removal of the items is complete if the reconfiguration manager receives user input from a user device indicating completion of the item removals. The user indicates completion of the item removals via the UI of the user device, such as, but not limited to, the UI 134 on the user device 132 in FIG. 1. The reconfiguration manager presents graphical instructions for relocation of items at 1508. The reconfiguration manager determines if relocation of the items is complete at 1510. If yes, the reconfiguration manager presents graphical instructions for addition of new items to the display. The graphical instructions are presented via the UI of the user interface. The process terminates thereafter.

While the operations illustrated in FIG. 15 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 15.

Figure 16:
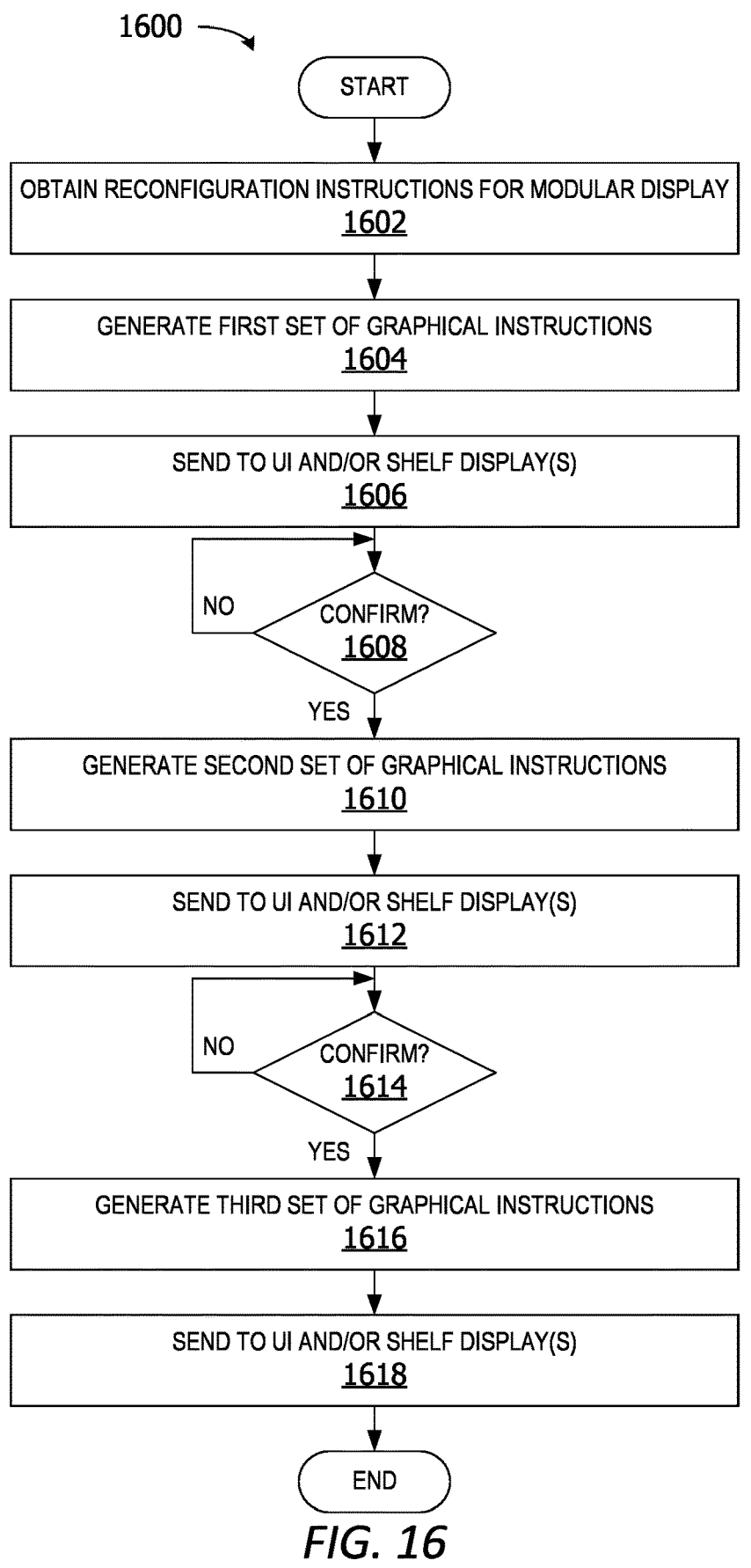
FIG. 16 is an exemplary flow chart illustrating operation of the computing device to provide graphical instructions for updating a modular display via a user device user interface (UI) and/or shelf display devices.

FIG. 16 is an exemplary flow chart illustrating operation of the computing device to provide graphical instructions for updating a modular display via a user device user interface (UI) and/or shelf display devices. The process shown in FIG. 16 is performed by a reconfiguration manager component, executing on a computing device, such as the computing device 102 or the user device 132 in FIG. 1.

The process begins by obtaining reconfiguration instructions for a modular display at 1602. The reconfiguration instructions are transmitted to the reconfiguration manager when a user scans a modular display ID tag on a portion of the modular display, such as, but not limited to, the ID tag 228 in FIG. 1. The reconfiguration manager generates a first set of graphical instructions at 1604. The first set of graphical instructions include instructions identifying a set of items to be removed from the modular display. The first set of graphical instructions are sent to a UI on a user device and/or one or more shelf displays on a modular display at 1606. The one or more shelf display(s) include a display device, such as, but not limited to, the plurality of shelf edge display devices 112 in FIG. 1, the shelf edge display device(s) 216, the shelf edge display devices 402 in FIG. 4 and/or the shelf edge display 502 in FIG. 5. The reconfiguration manager determines whether confirmation is received from the user at 1608. The confirmation indicates the first set of graphical instructions have been completed. The reconfiguration manager generates a second set of graphical instructions at 1610. The reconfiguration manager sends the second set of graphical instructions to the UI and/or shelf display(s) at 1612. The second set of graphical instructions instruct the user to relocate (move) one or more items on the modular display. The reconfiguration manager determines whether confirmation that the items have been relocated is received at 1614. If yes, the reconfiguration manager generates a third set of graphical instructions for adding new items to the modular display at 1616. The reconfiguration manager sends the third set of graphical instructions to the UI of the user device and/or one or more shelf display(s) at 1618. The process terminates thereafter.

While the operations illustrated in FIG. 16 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 16.

Figure 17:
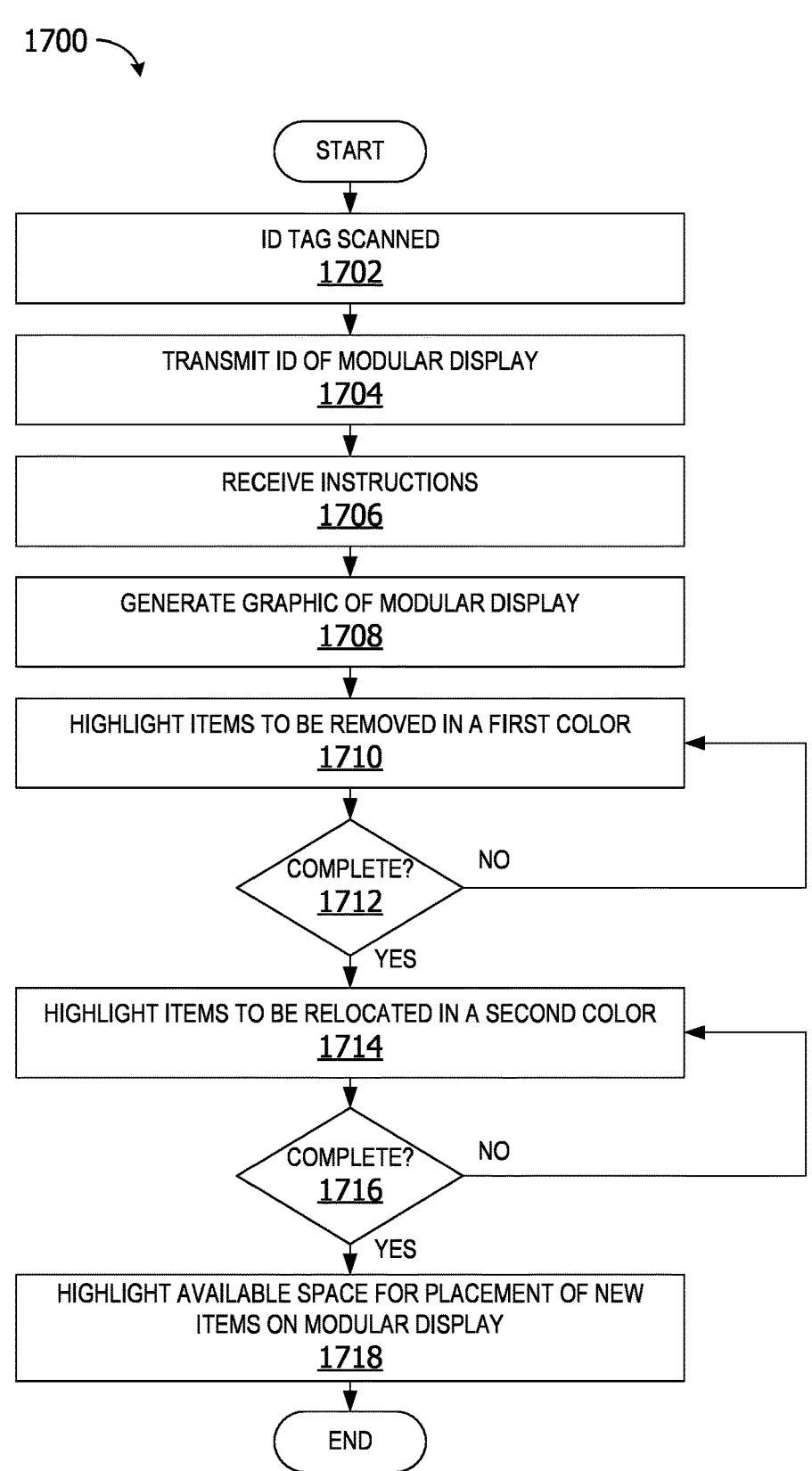
FIG. 17 is an exemplary flow chart illustrating operation of the computing device to obtain reconfiguration instructions using a modular display identifier (ID) to provide color-coded indicators guiding a user to reconfigure a modular display.

FIG. 17 is an exemplary flow chart illustrating operation of the computing device to obtain reconfiguration instructions using a modular display identifier (ID) to provide color-coded indicators guiding a user to reconfigure a modular display. The process 1700 shown in FIG. 17 is performed by a reconfiguration application, executing on a computing device, such as the computing device 102 in FIG. 1 and/or the user device 132 in FIG. 1 and FIG. 2.

The process begins when an ID tag on a modular display is scanned at 1702. The ID tag is scanned by a scanner device on a user device, such as the user device 132 in FIG. 1 and FIG. 2. The modular display ID is transmitted to the reconfiguration manager via a network. The reconfiguration application receives graphical instructions from the reconfiguration manager at 1706. The reconfiguration application generates a graphic of the modular display at 1708. The graphic represents the modular display, including the shelves and items on the shelves, such as, but not limited to, the modular display graphic 224 in FIG. 2. The reconfiguration application on the user device highlights items to be removed in a first color at 1710. The reconfiguration application determines if removal of the items is complete at 1712. The reconfiguration application receives a user input via the UI indicating whether the item removal task is complete. If it is complete, the reconfiguration application highlights the item graphics for items that are to be relocated (moved) in a second color at 1714. The reconfiguration application determines if the item relocation is complete at 1716. If yes, the reconfiguration application highlights available space for placement of new items on the modular display at 1718. The reconfiguration application optionally also includes text description and/or an item image of the items to be added to the modular display. The available space is highlighted in a third color indicating items to be added, such as the color green. The process terminates thereafter.

While the operations illustrated in FIG. 17 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 17.

Figure 18:
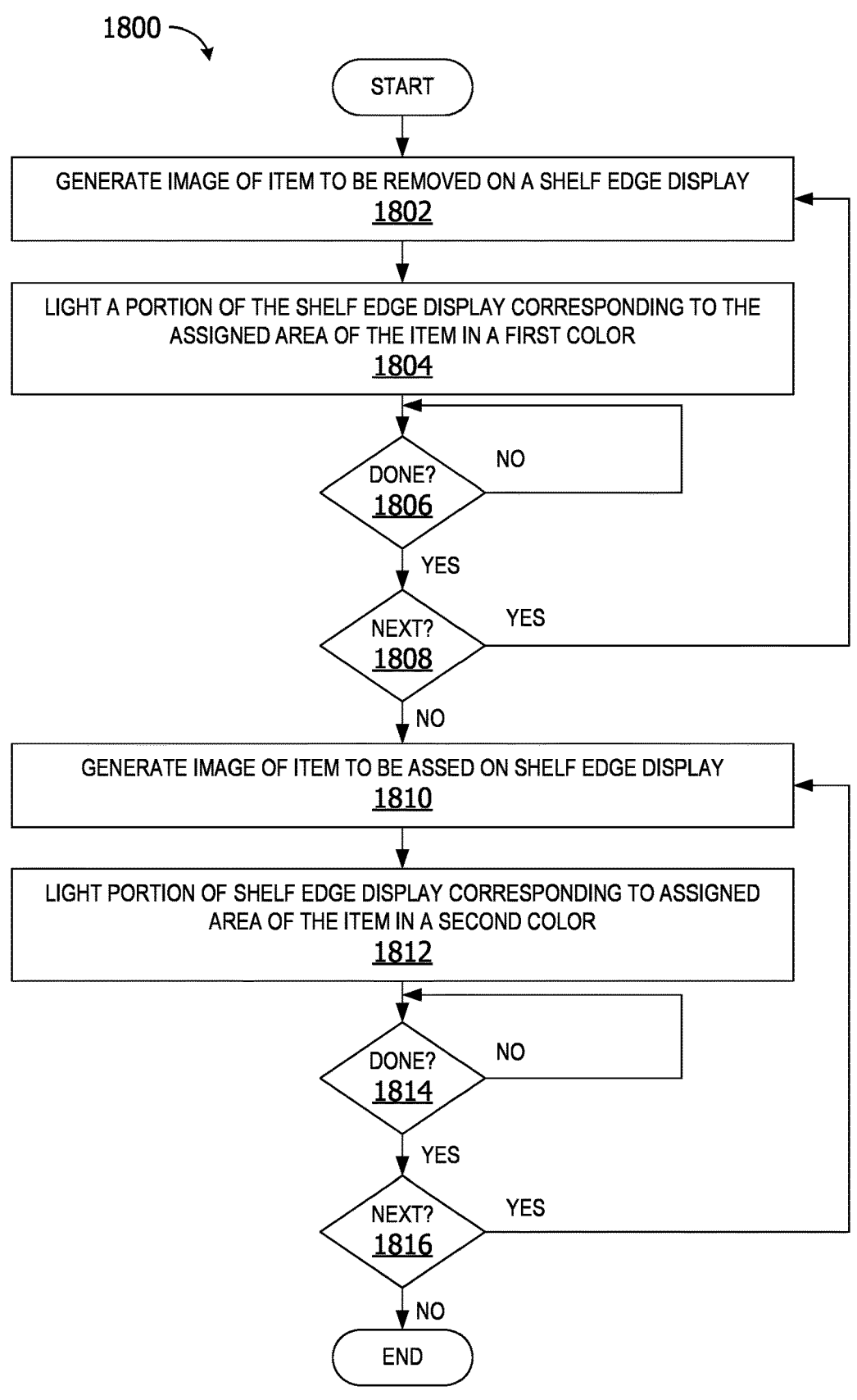
FIG. 18 is an exemplary flow chart illustrating operation of the computing device to generate item images and color-coded indicators to a user via shelf display devices.

FIG. 18 is an exemplary flow chart illustrating operation of the computing device to generate item images and color-coded indicators to a user via shelf display devices. The process 1800 shown in FIG. 18 is performed by a reconfiguration manager component, executing on a computing device, such as the computing device 102 or the user device 132 in FIG. 1.

The process generates an image of the item to be removed on a shelf edge display at 1802. Instructions for generating the image of the item are transmitted to the shelf edge display device by the reconfiguration manager. The shelf edge display device lights a portion of the shelf edge display corresponding to the assigned area of the item in a first color at 1804. A determination is made whether the item removal is complete at 1806. If yes, the reconfiguration manager determines if a next item is to be removed from the modular display during the reconfiguration process. If yes, the reconfiguration manager iteratively performs operations 1802 through 1808 until all items in the set of items are removed. An image of an item to be added to the modular display is generated on a shelf edge display corresponding to an area on a shelf where the item or instances of the item are to be placed at 1810. A portion of the shelf edge display corresponding to the assigned area of the item lights in a second color at 1812. A determination is made whether adding the item or instances of the item by the user has been done at 1814. If yes, a determination is made whether a next item is to be added to the modular display in accordance with the new configuration at 1816. If yes, the reconfiguration manager iteratively executes operations 1810 through 1816 until confirmation is received that all items instructed to be added have been added to the modular display by the user at 1816. The process terminates thereafter.

While the operations illustrated in FIG. 18 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 18.

Figure 19:
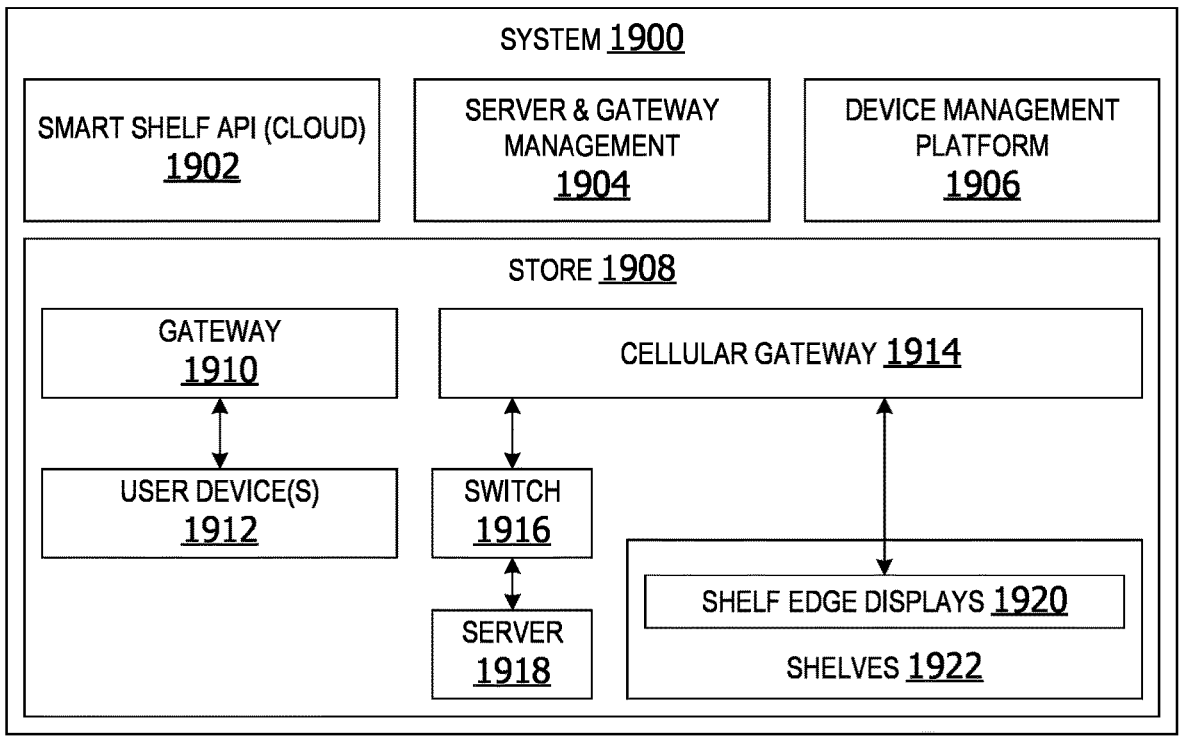
FIG. 19 is an exemplary block diagram illustrating an exemplary operating environment for implementing a reconfiguration management system for providing graphical instructions for reconfiguring a modular display.

FIG. 19 is an exemplary block diagram illustrating an exemplary operating environment 1900 for implementing a reconfiguration management system for providing graphical instructions for reconfiguring a modular display. A smart shelf application programming interface (API) 1902 enables a reconfiguration manager on a store 1908 server 1918 to transmit graphical reconfiguration instructions to one or more smart shelf edge display devices for presentation to the user. A server and gateway management 1904 and device management platform 1906 enable the user device(s) 1912, server 1918 and/or shelf edge displays 1920 on one or more shelves 1922 to communicate and synchronize presentation of reconfiguration instructions to the user via the gateway 1910 and/or cellular gateway 1914. A switch 1916 is optionally included enabling communications and transmission of data from the store server 1918 via the cellular gateway 1914.

The server 1918 is a computing device associated with a retail environment, such as, but not limited to, the computing device 102 in FIG. 1. The user device(s) 1912 include one or more computing devices associated with a user for presenting a modular display graphic with item images and color-coded indicators synchronized with color-coded indicators presented via the shelf edge displays 1920, such as, but not limited to, the user device 132 in FIG. 1 and FIG. 2.

Additional Examples

In some embodiments, the system provides a full shelf display graphic including all items in the product assortment for the shelf based on a planogram on a user device. The shelf edge digital display device displays a digital representation of items and/or item tags with color-coded highlights of the space between the item tags associated with items to be removed, moved, or added to the digital display during the reconfiguration. In these embodiments, a picture of the item to be removed, moved, or added is shown on the shelf edge display device but not on the full modular display graphic.

In an example scenario, a user scans a shelf tag on a modular display using a scanner device on a mobile user device. The reconfiguration application on the user device uses the modular display ID obtained from the shelf tag to obtain configuration data for the modular display. The reconfiguration application generates and displays a modular display graphic via a UI on the user device and/or on the shelf display device. The reconfiguration application queries the user to indicate whether the user is ready to reconfigure the modular display in accordance with a new updated item configuration for a new shelf layout. If the user indicates ready, the reconfiguration application displays the modular display graphic with red highlighting over items to be removed. In this example, only specific products in those highlighted area are items to be removed. The reconfiguration application queries the user as to whether removal of the highlighted items is complete. If the user indicates removal is complete, the reconfiguration application highlights areas on the modular display for placement of new items in green.

In some embodiments, the system provides color-coded indicators (highlights) via the user device and/or shelf display devices only. In other embodiments, the system provides images of items to be removed, moved, or added. In other embodiments, the system provides both color-coded indicators and images of items to be removed, moved and/or added via the user device and/or the shelf display devices.

In some embodiments, the system provides the color-coded indicators and item images via the user interface on a user device associated with a user. In other embodiments, the system provides the color-coded indicators and item images for items to be removed, moved, or added via one or more shelf edge display devices. In still other embodiments, the color-coded indicators, and items images for items to be removed, moved and/or added via both the UI on the user device and one or more shelf edge display devices.

In another example scenario, a user logs into the reconfiguration application on a user device. The user scans a barcode on a modular display tag (shelf tag) on a portion of a modular display to obtain the modular display ID. The barcode is used to identify the location of the modular display and retrieve configuration data for the modular display via a cloud API. The reconfiguration application requests the configuration data for the modular display from a cloud server and populates on the application using the received configuration data. The application initiates the process of reconfiguring the modular display if the user indicates the user is ready to begin. The reconfiguration process guides the user through a series of sequential steps or operations for reconfiguring the items on the modular display in accordance with an updated (new) item configuration reflecting a new product assortment shelf layout based on a planogram.

In some embodiments, the reconfiguration application on the user device receives updates from the cloud. The reconfiguration application and the shelf display devices on the modular display coordinate with a reconfiguration manager such that both the user device and the shelf display devices display the same graphical instructions (color-coded indicators and/or product images) substantially simultaneously in real-time as the user is reconfiguring the items on the display. In these embodiments, the reconfiguration manager transmits the graphical instructions to the user device and to the shelf edge display devices such that the sequential instructions for reconfiguring the display are presented to the user in a coordinated manner via both the user device and the shelf edge display device(s).

In other embodiments, a reconfiguration manager obtains reconfiguration instructions from a cloud server. The reconfiguration manager breaks the reconfiguration instructions down into sequential steps in which any items are first removed, then items are relocated and finally items are added to the display. This minimizes human labor and time consumed during resetting of the modular display and eliminates wasted effort spent removing items which are included in both the current item configuration and the new item configuration. The order of removing items, moving items, and then adding items further ensures adequate available space for placement of new items onto the display without completely removing every item from the display at one time. This saves time, reduces user effort, and enables resetting to be performed in phases guided by color-coded graphical indicators, pictures of the items to be removed, moved, and added, as well as text instructions in a coordinated manner from multiple devices.

The system optimally guides a user through the process of changing the product configuration on the shelves. It uses graphical indicators and product images to show which products should be removed, which products need to be moved and which products need to be added. The system automatically guides a user through all these steps in a seamless way.

The system uses graphical indicators and product images on digital tags (digital shelf displays) to guide a user through the process of changing the product configuration on store shelves. These graphical indicators and product images on digital tags show which products should be removed, moved, and added by a user. The system to accomplish this consists of digital displays at shelf edges, a cloud API service with database, an in-store server, and mobile application.

The digital displays at shelf edges show color indicators around the product tags to indicate whether a product should be moved, removed, or added. The product images help the associate know what products to remove, move or add on the shelf. The cloud API service with database stores the future and prior state of the product configuration on the shelves and provides an interface to communicate that data to the in-store server and mobile application. The in-store server periodically queries the cloud API for updates and communicates these updates to the shelf edge displays. The mobile application allows a user to initiate a change in product configuration on the shelf and guides the user (step-by-step) through the removal, move, and add process. Graphical indicators on the application, which mirror the indicators on the shelf edge display, give additional help to the user on what needs to be updated on the shelf during the process.

Other embodiments provide a system for automatic product reconfiguration guidance for shelves. The system provides color indicators (lights) on shelf digital displays (digital product tags) used to indicate reconfiguration of a product. The reconfiguration of the product includes moving to a different location, removing it from a shelf and/or adding additional instances of the product. The system provides coordinated product images on a user interface of a user device showing the product reconfiguration and indicating which product to move, remove or add to various shelves. The system includes a cloud server to store previous and current and future product configurations for shelf displays. The cloud server sends updates to the in-store server. The in-store server sends updates to the shelf displays and/or user device app in real time as the display is being reconfigured.

In other embodiments, the system includes a process or algorithm to identify differences between the current shelving layout and a new one. It simplifies the task of modular display setting into simple steps to save human users a significant amount of time when moving from one shelving layout to another. For a given shelf on a given section, the system calculates the number of facings of each product group, the x-position of each product group, and the widths of each product group in the current layout and the upcoming layout. The system identifies product removes processing from the left to the right by comparing the product groups in the current and upcoming layouts to see if they both have the same product groups in each. If a product group is in the current layout and not in the upcoming layout, the product group is being removed from the upcoming planogram and is marked as remove.

The system compares the number of facings for each product group to see if the number of facings in each group is being reduced in the upcoming layout. If there is a reduction in any of the facings from the current to the upcoming layout, they are extra facings, and are marked as remove starting from the right.

Alternatively, or in addition to the other examples described herein, examples include any combination of the following:

calculate a number of facings for each product group in a current configuration and a new configuration;

identify the x-position of each product group in the current configuration and the new configuration;

obtain the width of each product group in the current configuration and the new configuration via an API;

identify a sequence of item removals, item moves and item additions going from left-to-right using the calculated width, the calculated number of facings and the identified x-position of each product group;

identify a sequence of item removals, item moves and item additions going from right-to-left using the calculated width, the calculated number of facings and the identified x-position of each product group;

select the sequence of item removals, item moves and item additions having a fewest number of additions and removals for use in generating the reconfiguration instructions for changing a configuration of a portion of a modular display from the current configuration of items to the new configuration using the fewest number of item removals and item additions;

generate a first set of images of the first set of items via the first set of shelf edge display devices for presentation to a user, the first set of images comprising an image of each type of item to be removed from a shelf in the plurality of shelves;

generate a second set of images of the second set of items via the second set of shelf edge display devices, the second set of images comprising an image of each item in the second set of items to be relocated from a first location on a first shelf in the plurality of shelves to a second location on a second shelf in the plurality of shelves;

generate a third set of images of the third set of items via the third set of shelf edge display devices, the third set of images comprising an image of each item in the third set of items to be added to a location on a shelf in the plurality of shelves;

generate a first set of color-coded indicators associated with a first set of locations of items on the modular display to be removed from the modular display, the first set of color-coded indicators comprising a first light band of a first color corresponding to an item display area for each item to be removed from a shelf in the plurality of shelves;

generate a second set of color-coded indicators associated with a second set of locations on the modular display available for placement of items onto the modular display, the second set of color-coded indicators comprising a second light band of a second color corresponding to the item display area that is available for placement of each to be relocated on the modular display;

generate a third set of color-coded indicators associated with items to be relocated from a first location on the modular display to a different second location on the modular display, the third set of color-coded indicators comprising a first set of bands of a third color associated with a set of locations of the second set of items associated with the first configuration and a second set of bands of a fourth color associated with a set of locations of items assigned to the second set of items in the second configuration;

present the first set of graphical instructions of the reconfiguration instructions via a user interface of the user device;

upon receiving the first confirmation indicating removal of the first set of items from the modular display, present the second set of graphical instructions via the user interface of the user device;

upon receiving the second confirmation indicating relocation of the second set of items on the modular display, present the third set of graphical instructions via the user interface of the user device;

present the reconfiguration instructions to a user via the plurality of shelf edge display devices and a user interface of a user device in a sequence of reconfiguration instructions synchronized on both the plurality of shelf edge display devices and the user device;

generate a modular display graphic representing the plurality of shelves and the plurality of items associated with the modular display via a user interface of a user device;

overlay a color-coded indicator of a first color on each item in the plurality of items to be removed from the modular display;

upon receiving confirmation of the removal of each item in the plurality of items to be removed from the modular display, overlay a color-coded indicator of a second color on a new location on the modular display assigned to each item to be added to the modular display in accordance with the second configuration;

obtaining reconfiguration instructions from a cloud server via a network, the reconfiguration instructions comprising graphical instructions for sequentially reconfiguring the modular display from a first configuration of items to a second configuration of items on the modular display;

generating a first set of graphical instructions using the reconfiguration instructions for presentation to a user via a user interface (UI) of a user device, the first set of graphical instructions identifying a first set of items in the plurality of items to be removed from the modular display;

receiving a first confirmation indicating removal of the first set of items from the modular display is complete;

generating a second set of graphical instructions using the reconfiguration instructions for presentation to the user via the UI upon receipt of the first confirmation, the second set of graphical instructions identifying a second set of items in the plurality of items to be relocated from an original location in accordance with the first configuration to a new location in accordance with the second configuration;

receiving a second confirmation indicating relocation of the second set of items on the modular display is complete;

generating a third set of graphical instructions using the reconfiguration instructions for presentation to the user via the UI upon receipt of the second confirmation, the third set of graphical instructions identifying a third set of items to be added to the modular display for efficient reconfiguration of the modular display from the first configuration to the second configuration;

presenting the first set of graphical instructions to the user via a first set of shelf edge display devices in a plurality of shelf edge display devices;

upon receiving the first confirmation from the user device, presenting the second set of graphical instructions to the user via a second set of shelf edge display devices in the plurality of shelf edge display devices;

upon receiving the second confirmation from the user device, present the third set of graphical instructions to the user via a third set of shelf edge display devices in the plurality of shelf edge display devices;

presenting a first set of images of the first set of items via the first set of shelf edge display devices for presentation to a user, the first set of images comprising an image of each type of item to be removed from a shelf in the plurality of shelves;

presenting a second set of images of the second set of items via the second set of shelf edge display devices, the second set of images comprising an image of each item in the second set of items to be relocated from a first location on a first shelf in the plurality of shelves to a second location on a second shelf in the plurality of shelves;

presenting a third set of images of the third set of items via the third set of shelf edge display devices, the third set of images comprising an image of each item in the third set of items to be added to a location on a shelf in the plurality of shelves;

generating a first set of color-coded indicators associated with a first set of locations of items on the modular display to be removed from the modular display, the first set of color-coded indicators comprising a first light band of a first color corresponding to an item display area for each item to be removed from a shelf in the plurality of shelves;

generating a second set of color-coded indicators associated with a second set of locations on the modular display available for placement of items onto the modular display, the second set of color-coded indicators comprising a second light band of a second color corresponding to the item display area that is available for placement of each to be relocated on the modular display;

presenting the reconfiguration instructions to a user via the plurality of shelf edge display devices and a user interface of a user device in a sequence of reconfiguration instructions synchronized on both the plurality of shelf edge display devices and the user device;

generating a modular display graphic representing the plurality of shelves and the plurality of items associated with the modular display via a user interface of a user device;

presenting the modular display graphic to the user via the user interface of the user device;

generating a color-coded indicator of a first color on each item in the plurality of items to be removed from the modular display;

upon receiving confirmation of the removal of each item in the plurality of items to be removed from the modular display, generating a color-coded indicator of a second color on a new location on the modular display assigned to each item to be added to the modular display in accordance with the second configuration;

providing a first graphical instruction to remove a first item from a first location on a first shelf on the modular display, the first graphical instruction comprising a first image of the first item and a first color indicator of a first color highlighting the first location on the first shelf, the first graphical instruction presented to the user substantially simultaneously via a shelf edge display device and a user interface device;

providing a second graphical instruction to add a second item to the modular display at the first location on the first shelf, the second graphical instruction comprising a second image of the second item and a second color indicator of a second color highlighting the first location on the first shelf, the second graphical instruction presented to the user substantially simultaneously via the shelf edge display device and the user interface device;

generate item removal graphical instructions based on the reconfiguration instructions for presentation to a user via a plurality of shelf edge display devices associated with a plurality of shelves on the modular display and a user interface of a user device associated with the user, the first set of graphical instructions identifying a first set of items in the plurality of items to be removed from the modular display;

generate item placement graphical instructions for presentation to the user via a third set of shelf edge display devices in the plurality of shelf edge display devices and the user interface upon receipt of the first confirmation, the item placement graphical instructions identifying a second set of items to be added to the modular display for efficient reconfiguration of the modular display from the first configuration to the second configuration;

upon receipt of a second confirmation indicating placement of the second set of items is complete, update a modular display status of the modular display in an item display database indicating reconfiguration of the modular display to the second configuration is complete;

present a first set of graphical instructions for removal of the first set of items, the first set of items comprising items present in the first configuration and absent from the second configuration;

present a second set of graphical instructions identifying a second set of items for relocation on the modular display upon receipt of the first confirmation of items, the second set of items comprising items assigned to a first location in the first configuration and assigned to a second location in the second configuration of items;

present a third set of graphical instructions identifying a third set of items to be added to the modular display for presentation to a user, the third set of items comprising items absent from the first configuration of items and present in the second configuration of items;

generate a modular display graphic representing the plurality of shelves and the plurality of items associated with the modular display via the user interface of a user device;

overlay a color-coded indicator of a first color on each item graphic in the modular display graphic to be removed from the modular display;

upon receiving confirmation of the removal of each item in the plurality of items to be removed from the modular display, overlay a color-coded indicator of a second color on a new location on the modular display assigned to each item to be added to the modular display in accordance with the second configuration;

present a first set of images of the first set of items via the first set of shelf edge display devices for presentation to a user, the first set of images comprising an image of each type of item to be removed from a shelf in the plurality of shelves;

present a second set of images of the second set of items via the second set of shelf edge display devices, the second set of images comprising an image of each item in the second set of items to be relocated from a first location on a first shelf in the plurality of shelves to a second location on a second shelf in the plurality of shelves;

present a third set of images of the third set of items via the third set of shelf edge display devices, the third set of images comprising an image of each item in the third set of items to be added to a location on a shelf in the plurality of shelves;

highlight each item in the plurality of items to be removed from the modular display using a first color indicator; and upon receiving confirmation of the removal of each item in the plurality of items to be removed from the modular display, highlight a new location on the modular display assigned to each new item to be added to the modular display in accordance with the second configuration using a second color indicator;

provide a first graphical instruction to remove a first item from a first location on a first shelf on the modular display to the user via the user interface, the first graphical instruction comprising a first image of the first item and a first color indicator of a first color highlighting the first location on a graphical representation of the first shelf;

present the first image of the first item and a first color band of the first color via a first shelf edge display associated with the first location of the first item;

receive user confirmation of removal of the first item from the modular display;

provide a second graphical instruction to add a second item to the modular display at the first location on the first shelf via the user interface, the second graphical instruction comprising a second image of the second item and a second color indicator of a second color highlighting the first location on the graphical representation of the first shelf; and present the second image of the second item and a second color band of the second color via the first shelf edge display, the second graphical instruction presented to the user substantially simultaneously via the first shelf edge display device and the user interface.

At least a portion of the functionality of the various elements in FIG. 1, FIG. 2, FIG. 3, FIG. 4, FIG. 5, FIG. 6, FIG. 7 and FIG. 19 can be performed by other elements in FIG. 1, FIG. 2, FIG. 3, FIG. 4, FIG. 5, FIG. 6, FIG. 7 and FIG. 19, or an entity (e.g., processor 206, web service, server, application program, computing device, etc.) not shown in FIG. 1, FIG. 2, FIG. 3, FIG. 4, FIG. 5, FIG. 6, FIG. 7 and FIG. 19.

In some embodiments, the operations illustrated in FIG. 14, FIG. 15, FIG. 16, FIG. 17, and FIG. 18 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other embodiments, a computer readable medium having instructions recorded thereon which when executed by a computer device cause the computer device to cooperate in performing a method of providing dynamic display reconfiguration indicators, the method comprising obtaining reconfiguration instructions from a cloud server via a network, the reconfiguration instructions comprising graphical instructions for sequentially reconfiguring a modular display from a first configuration of items to a second configuration of items on the modular display; generating a first set of graphical instructions using the reconfiguration instructions for presentation to a user via a user interface (UI) of a user device, the first set of graphical instructions identifying a first set of items in a plurality of items to be removed from the modular display; receiving a first confirmation indicating removal of the first set of items from the modular display is complete; generating a second set of graphical instructions using the reconfiguration instructions for presentation to the user via the UI upon receipt of the first confirmation, the second set of graphical instructions identifying a second set of items in the plurality of items to be relocated from an original location in accordance with the first configuration to a new location in accordance with the second configuration; receiving a second confirmation indicating relocation of the second set of items on the modular display is complete; and generating a third set of graphical instructions using the reconfiguration instructions for presentation to the user via the UI upon receipt of the second confirmation, the third set of graphical instructions identifying a third set of items to be added to the modular display for efficient reconfiguration of the modular display from the first configuration to the second configuration.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable, and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions, or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for providing dynamic display reconfiguration guidance. For example, the elements illustrated in FIG. 1, FIG. 2, FIG. 3, FIG. 4, FIG. 5, FIG. 6, FIG. 7, and FIG. 19, such as when encoded to perform the operations illustrated in FIG. 14, FIG. 15, FIG. 16, FIG. 17, and FIG. 18, constitute exemplary means for obtaining reconfiguration instructions for sequentially reconfiguring a modular display from a first configuration of items to a second configuration of items on the modular display via a network; exemplary means for generating item removal graphical instructions based on the reconfiguration instructions for presentation to a user via a plurality of shelf edge display devices associated with a plurality of shelves on the modular display and a user interface of a user device associated with the user, the first set of graphical instructions identifying a first set of items in a plurality of items to be removed from the modular display; exemplary means for receiving confirmation indicating removal of the first set of items from the modular display; exemplary means for generating item placement graphical instructions for presentation to the user via a third set of shelf edge display devices in the plurality of shelf edge display devices and the user interface upon receipt of the first confirmation, the item placement graphical instructions identifying a second set of items to be added to the modular display for efficient reconfiguration of the modular display from the first configuration to the second configuration; and upon receipt of a second confirmation indicating placement of the second set of items is complete, exemplary means for updating a modular display status of the modular display in an item display database indicating reconfiguration of the modular display to the second configuration is complete.

Other non-limiting examples provide one or more computer storage devices having a first computer-executable instructions stored thereon for providing dynamic display reconfiguration guidance. When executed by a computer, the computer performs operations including obtaining reconfiguration instructions from a cloud server via a network, the reconfiguration instructions comprising graphical instructions for sequentially reconfiguring a modular display from a first configuration of items to a second configuration of items on the modular display; generating a first set of graphical instructions using the reconfiguration instructions for presentation to a user via a user interface (UI) of a user device, the first set of graphical instructions identifying a first set of items in a plurality of items to be removed from the modular display; receiving a first confirmation indicating removal of the first set of items from the modular display is complete; generating a second set of graphical instructions using the reconfiguration instructions for presentation to the user via a the UI upon receipt of the first confirmation, the second set of graphical instructions identifying a second set of items in the plurality of items to be relocated from an original location in accordance with the first configuration to a new location in accordance with the second configuration;

receiving a second confirmation indicating relocation of the second set of items on the modular display is complete; and generating a third set of graphical instructions using the reconfiguration instructions for presentation to the user via the UI upon receipt of the second confirmation, the third set of graphical instructions identifying a third set of items to be added to the modular display for efficient reconfiguration of the modular display from the first configuration to the second configuration.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to "A" only (optionally including elements other than "B"); in another embodiment, to B only (optionally including elements other than "A"); in yet another embodiment, to both "A" and "B" (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either" "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of 'A' and 'B'" (or, equivalently, "at least one of 'A' or 'B'," or, equivalently "at least one of 'A' and/or 'B'") can refer, in one embodiment, to at least one, optionally including more than one, "A", with no "B" present (and optionally including elements other than "B"); in another embodiment, to at least one, optionally including more than one, "B", with no "A" present (and optionally including elements other than "A"); in yet another embodiment, to at least one, optionally including more than one, "A", and at least one, optionally including more than one, "B" (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for providing dynamic display reconfiguration indicators, the system comprising:
a modular display comprising a plurality of shelves displaying a plurality of items, the modular display having a modular display identifier (ID) tag;
a plurality of shelf edge display devices mounted to the plurality of shelves and configured to display reconfiguration data; and
a computer-readable medium storing instructions that are operative upon execution by a processor communicatively coupled by a network to the plurality of shelf edge display devices, a user device, and a cloud server storing the reconfiguration data to:
receive, from the user device by the network, the modular display ID tag scanned by a scanner device of the user device;
generate reconfiguration instructions based on the reconfiguration data retrieved from the cloud server using the modular display ID tag for sequentially reconfiguring the modular display from a first configuration of items to a second configuration of items on the modular display;
display a first set of graphical instructions associated with the reconfiguration instructions to a user via a first set of shelf edge display devices in the plurality of shelf edge display devices and a user interface of the user device simultaneously, the first set of graphical instructions identifying a first set of items in the plurality of items to be removed from the modular display;
upon receiving, from the user device, a first confirmation indicating removal of the first set of items from the modular display, display a second set of graphical instructions associated with the reconfiguration instructions to the user via a second set of shelf edge display devices in the plurality of shelf edge display devices and the user interface simultaneously, the second set of graphical instructions identifying a second set of items in the plurality of items to be relocated from an original location in accordance with the first configuration to a new location in accordance with the second configuration; and
upon receiving, from the user device, a second confirmation indicating relocation of a second set of items on the modular display, display a third set of graphical instructions to the user via a third set of shelf edge display devices in the plurality of shelf edge display devices and the user interface simultaneously, the third set of graphical instructions identifying a third set of items to be added to the modular display for efficient reconfiguration of the modular display from the first configuration to the second configuration.

2. The system of claim 1, wherein the instructions are further operative to:
generate a first set of images of the first set of items via the first set of shelf edge display devices for presentation to a user, the first set of images comprising an image of each type of item to be removed from a shelf in the plurality of shelves;
generate a second set of images of the second set of items via the second set of shelf edge display devices, the second set of images comprising an image of each item in the second set of items to be relocated from a first location on a first shelf in the plurality of shelves to a second location on a second shelf in the plurality of shelves; and
generate a third set of images of the third set of items via the third set of shelf edge display devices, the third set of images comprising an image of each item in the third set of items to be added to a location on a shelf in the plurality of shelves.

3. The system of claim 1, wherein the instructions are further operative to:
generate a first set of color-coded indicators associated with a first set of locations of items on the modular display to be removed from the modular display, the first set of color-coded indicators comprising a first light band of a first color corresponding to an item display area for each item to be removed from a shelf in the plurality of shelves; and
generate a second set of color-coded indicators associated with a second set of locations on the modular display available for placement of items onto the modular display, the second set of color-coded indicators comprising a second light band of a second color corresponding to the item display area that is available for placement of each to be relocated on the modular display.

4. The system of claim 1, wherein the instructions are further operative to:
obtain a number of facings for each product group in a current configuration and a new configuration;
obtain an x-position of each product group in the current configuration and the new configuration;
obtain a width of each product group in the current configuration and the new configuration;
calculate a sequence of item removals, item moves and item additions going from left-to-right using the calculated width, the calculated number of facings and the obtained x-position of each product group;

identify a sequence of item removals, item moves and item additions going from right-to-left using the calculated width, the calculated number of facings and the obtained x-position of each product group; and select the sequence of item removals, item moves and item additions having a fewest number of additions and removals for use in generating the reconfiguration instructions.

5. The system of claim 1, wherein the instructions are further operative to:

present the first set of graphical instructions of the reconfiguration instructions via a user interface of the user device;

upon receiving the first confirmation indicating removal of the first set of items from the modular display, present the second set of graphical instructions via the user interface of the user device; and upon receiving the second confirmation indicating relocation of the second set of items on the modular display, present the third set of graphical instructions via the user interface of the user device.

6. The system of claim 1, wherein the instructions are further operative to:

present the reconfiguration instructions to a user via the plurality of shelf edge display devices and a user interface of a user device in a sequence of reconfiguration instructions synchronized on both the plurality of shelf edge display devices and the user device.

7. The system of claim 1, wherein the instructions are further operative to:

generate a modular display graphic representing the plurality of shelves and the plurality of items associated with the modular display via a user interface of a user device;

overlay a color-coded indicator of a first color on each item graphic in the modular display graphic associated with an item to be removed from the modular display; and upon receiving confirmation of the removal of each item in the plurality of items to be removed from the modular display, overlay a color-coded indicator of a second color on a new location on the modular display graphic associated with a location on the modular display assigned to each item to be added to the modular display in accordance with the second configuration.

8. A method for providing dynamic display reconfiguration indicators, the method comprising:

receiving, from a user device over a network, a modular display identifier (ID) tag scanned by a scanner device of the user device, the modular display ID tag associated with a modular display;

generating reconfiguration instructions from a cloud server via the network using the modular display ID tag, the reconfiguration instructions comprising graphical instructions for sequentially reconfiguring the modular display from a first configuration of items to a second configuration of items on the modular display;

displaying a first set of graphical instructions using the reconfiguration instructions to a user via a plurality of shelf edge display devices of the modular display and a user interface (UI) of a user device simultaneously, the first set of graphical instructions identifying a first set of items in a plurality of items to be removed from the modular display;

receiving a first confirmation indicating removal of the first set of items from the modular display is complete;

displaying a second set of graphical instructions using the reconfiguration instructions to the user via the plurality of shelf edge display devices and the UI simultaneously upon receipt of the first confirmation, the second set of graphical instructions identifying a second set of items in the plurality of items to be relocated from an original location in accordance with the first configuration to a new location in accordance with the second configuration;

receiving a second confirmation indicating relocation of the second set of items on the modular display is complete; and displaying a third set of graphical instructions using the reconfiguration instructions to the user via the plurality of shelf edge display devices and the UI simultaneously upon receipt of the second confirmation, the third set of graphical instructions identifying a third set of items to be added to the modular display for efficient reconfiguration of the modular display from the first configuration to the second configuration.

9. The method of claim 8, further comprising:

calculating a sequence of item removals, item moves and item additions going from left-to-right using a calculated width, a calculated number of facings and an x-position of each product group in a current configuration and a new configuration;

calculating a sequence of item removals, item moves and item additions going from right-to-left using the calculated width, the calculated number of facings and the x-position of each product group; and selecting the sequence of item removals, item moves and item additions having a fewest number of additions and removals for use in generating the reconfiguration instructions.

10. The method of claim 8, further comprising:

presenting a first set of images of the first set of items via a first set of the plurality of shelf edge display devices for presentation to a user, the first set of images comprising an image of each type of item to be removed from a shelf in a plurality of shelves;

presenting a second set of images of the second set of items via a second set of the plurality of shelf edge display devices, the second set of images comprising an image of each item in the second set of items to be relocated from a first location on a first shelf in the plurality of shelves to a second location on a second shelf in the plurality of shelves; and presenting a third set of images of the third set of items via a third set of plurality of shelf edge display devices, the third set of images comprising an image of each item in the third set of items to be added to a location on a shelf in the plurality of shelves.

11. The method of claim 8, further comprising:

generating a first set of color-coded indicators associated with a first set of locations of items on the modular display to be removed from the modular display, the first set of color-coded indicators comprising a first light band of a first color corresponding to an item display area for each item to be removed from a shelf in a plurality of shelves; and generating a second set of color-coded indicators associated with a second set of locations on the modular display available for placement of items onto the modular display, the second set of color-coded indicators comprising a second light band of a second color corresponding to the item display area that is available for placement of each to be relocated on the modular display.

12. The method of claim 8, further comprising:

presenting the reconfiguration instructions to a user via a plurality of shelf edge display devices and a user interface of a user device in a sequence of reconfiguration instructions synchronized on both the plurality of shelf edge display devices and the user device.

13. The method of claim 8, further comprising:

generating a modular display graphic representing a plurality of shelves and the plurality of items associated with the modular display via a user interface of a user device;

presenting the modular display graphic to the user via the user interface of the user device;

generating a color-coded indicator of a first color on each item graphic in the modular display graphic representing an item in the plurality of items to be removed from the modular display; and upon receiving confirmation of the removal of each item in the plurality of items to be removed from the modular display, generating a color-coded indicator of a second color on a new location on the modular display graphic associated with a location on the modular display assigned to each item to be added to the modular display in accordance with the second configuration.

14. The method of claim 8, further comprising:

providing a first graphical instruction to remove a first item from a first location on a first shelf on the modular display, the first graphical instruction comprising a first image of the first item and a first color indicator of a first color highlighting the first location on the first shelf, the first graphical instruction presented to the user substantially simultaneously via a shelf edge display device and a user interface device; and providing a second graphical instruction to add a second item to the modular display at the first location on the first shelf, the second graphical instruction comprising a second image of the second item and a second color indicator of a second color highlighting the first location on the first shelf, the second graphical instruction presented to the user substantially simultaneously via the shelf edge display device and the user interface device.

15. One or more non-transitory computer storage devices having computer-executable instructions stored thereon, which, upon execution by a computer, cause the computer to perform operations comprising:

receive, from a user device over a network, a modular display identifier (ID) tag scanned by a scanner device of the user device, the modular display ID tag associated with a modular display;

obtain reconfiguration instructions from a cloud server over the network for sequentially reconfiguring the modular display from a first configuration of items to a second configuration of items on the modular display via a network;

display item removal graphical instructions based on the reconfiguration instructions for presentation to a user via a plurality of shelf edge display devices associated with a plurality of shelves on the modular display and a user interface of the user device associated with the user simultaneously, the item removal graphical instructions identifying a first set of items in a plurality of items to be removed from the modular display;

receive, from the user device, a first confirmation indicating removal of the first set of items from the modular display;

display item placement graphical instructions for presentation to the user via a second set of shelf edge display devices in the plurality of shelf edge display devices and the user interface upon receipt of the first confirmation, the item placement graphical instructions identifying a second set of items to be added to the modular display for efficient reconfiguration of the modular display from the first configuration to the second configuration; and upon receipt of a second confirmation indicating placement of the second set of items is complete, update a modular display status of the modular display in an item display database indicating reconfiguration of the modular display to the second configuration is complete.

16. The one or more non-transitory computer storage devices of claim 15, wherein the operations further comprise:

present a first set of graphical instructions for removal of the first set of items, the first set of items comprising items present in the first configuration and absent from the second configuration;

receive the first confirmation indicating removal of the first set of items from the modular display from the user device;

present a second set of graphical instructions identifying the second set of items for relocation on the modular display upon receipt of the first confirmation of items, the second set of items comprising items assigned to a first location in the first configuration and assigned to a second location in the second configuration of items;

receiving a second confirmation indicating relocation of the second set of items corresponding to the second configuration; and present a third set of graphical instructions identifying a third set of items to be added to the modular display for presentation to a user, the third set of items comprising items absent from the first configuration of items and present in the second configuration of items.

17. The one or more non-transitory computer storage devices of claim 15, wherein the operations further comprise:

generate a modular display graphic representing the plurality of shelves and the plurality of items associated with the modular display via the user interface of a user device;

overlay a color-coded indicator of a first color on each item graphic in the modular display graphic representing an item in the plurality of items to be removed from the modular display; and upon receiving confirmation of the removal of each item in the plurality of items to be removed from the modular display, overlay a color-coded indicator of a second color on a new location on the modular display graphic associated with a location on the modular display assigned to each item to be added to the modular display in accordance with the second configuration.

18. The one or more non-transitory computer storage devices of claim 15, wherein the operations further comprise:

present a first set of images of the first set of items via the first set of shelf edge display devices for presentation to a user, the first set of images comprising an image of each type of item to be removed from a shelf in the plurality of shelves;

present a second set of images of the second set of items via the second set of shelf edge display devices, the second set of images comprising an image of each item in the second set of items to be relocated from a first location on a first shelf in the plurality of shelves to a second location on a second shelf in the plurality of shelves; and present a third set of images of a third set of items via a third set of shelf edge display devices, the third set of images comprising an image of each item in the third set of items to be added to a location on a shelf in the plurality of shelves.

19. The one or more non-transitory computer storage devices of claim 15, wherein the operations further comprise:

generate a modular display graphic representing the plurality of shelves and the plurality of items associated with the modular display via the user interface of the user device;

highlight each item graphic representing an item in the plurality of items to be removed from the modular display using a first color indicator; and upon receiving confirmation of the removal of each item in the plurality of items to be removed from the modular display, highlight a new location on the modular display graphic corresponding to a location on the modular display assigned to each new item to be added to the modular display in accordance with the second configuration using a second color indicator.

20. The one or more non-transitory computer storage devices of claim 15, wherein the operations further comprise:

provide a first graphical instruction to remove a first item from a first location on a first shelf on the modular display to the user via the user interface, the first graphical instruction comprising a first image of the first item and a first color indicator of a first color highlighting the first location on a graphical representation of the first shelf;

present the first image of the first item and a first color band of the first color via a first shelf edge display device associated with the first location of the first item;

receive user confirmation of removal of the first item from the modular display;

provide a second graphical instruction to add a second item to the modular display at the first location on the first shelf via the user interface, the second graphical instruction comprising a second image of the second item and a second color indicator of a second color highlighting the first location on the graphical representation of the first shelf; and present the second image of the second item and a second color band of the second color via the first shelf edge display device, the second graphical instruction presented to the user substantially simultaneously via the first shelf edge display device and the user interface.

* * * * *